United States Patent [19]

Ibar

[11] Patent Number: 5,494,426
[45] Date of Patent: Feb. 27, 1996

[54] VIBRATING WALL SURFACES FOR MOLDING DEFORMABLE MATERIALS

[75] Inventor: Jean-Pierre Ibar, New Canaan, Conn.

[73] Assignee: Thermold Partners L.P., Stamford, Conn.

[21] Appl. No.: 183,462

[22] Filed: Feb. 17, 1994

Related U.S. Application Data

[63] Continuation-in-part of Ser. No. 880,926, May 11, 1992, Pat. No. 5,306,129, Ser. No. 124,147, Sep. 20, 1993, and Ser. No. 138,673, Oct. 19, 1993.

[51] Int. Cl.[6] ............................................. B29C 37/00
[52] U.S. Cl. .................. 425/3; 264/70; 264/71; 425/376.1; 425/432; 425/456; 425/522; 425/542
[58] Field of Search ......................... 425/389, 432, 425/456, 425, 3, 522, 542, 376.1; 264/71, 72, 314, 70

[56] References Cited

U.S. PATENT DOCUMENTS

| | | | |
|---|---|---|---|
| 2,408,627 | 10/1946 | Green | 425/456 |
| 3,205,289 | 9/1965 | Carpenter | 264/280 |

(List continued on next page.)

FOREIGN PATENT DOCUMENTS

| | | |
|---|---|---|
| 2017980 | 5/1970 | France . |
| 1140340 | 11/1962 | Germany . |

(List continued on next page.)

OTHER PUBLICATIONS

Menges, G., et al., "Self–Reinforcing Plastics: A New Approach to High–Performance Resins", *Modern Plastics International*, pp. 38–39 (Oct. 1981).

Keller, A., "Routes to High Modulus by Ultra–Orientation of Flexible Molecules", *Ultra–High Modulus Polymers*, Ed. A. Ciferri and I. M. Ward, pp. 325–333.

Rueda, et al., "X–Ray Diffraction Study of Die Drawn Poly (Arletherketone) (PEEK)", *Polymer Communications*, vol. 24, p. 258 (Sep. 1983).

Allan, et al., "Producing Void–Free Thick–Section Thermoplastic and Fibre Reinforced Thermoplastic Mouldings", *Plastics and Rubber International*, vol. 9, No. 2, pp. 32–36 (Apr. 1984).

Du Bois, J. H., et al., *Plastics Mold Engineering*, revised ed., pp. 438–451 (1965).

Ibar, J. P., "Instability in the Rubbery State Revealed by D.S.C. of Rheomolded® Polystyrene Samples", *Polymer Communications*, vol. 24, pp. 331–335 (1983).

Ibar, J. P., "Rheomolding: A New Process to Mold Polymeric Materials", *Polymer–Plastic Technology Engineering*, vol. 17, No. 1, pp. 11, 12, 17, 19–22, 25–32, 35–36, 38–44 (1981).

*Shock and Vibration Handbook*, 2 ed., edited by C. M. Harris and C. E. Crede, p. 35–5 (1976).

*Primary Examiner*—Robert B. Davis
*Attorney, Agent, or Firm*—Seidel Gonda Lavorgna & Monaco

[57] ABSTRACT

The present invention provides an apparatus for shaping deformable materials during molding processes. Such an apparatus includes, among other things, a vibrating wall assembly. The vibrating wall assembly fits the contours of at least a portion of a mold's cavity. The vibrating wall assembly includes a pliable wall positioned within the mold. The pliable wall is positioned such that its outside wall surface is adjacent to a portion of the mold's inside wall surface; and its inside wall surface defines a portion of the geometric configuration of the material passing thereover. The pliable wall is designed to deform from its original shape when a positive or negative pressure is exerted on its inside or outside wall surface. This positive and/or negative pressure is generated, at least in part, by the displacement of a displaceable fluid. This fluid is contained within a chamber. The chamber is in communication with a portion of the pliable wall's outside wall surface. Also included is a device which displaces the fluid contained within the chamber. This device controls the amount, frequency and amplitude of the wall assembly's vibration by controlling fluid displacement.

25 Claims, 13 Drawing Sheets

U.S. PATENT DOCUMENTS

| | | | |
|---|---|---|---|
| 3,275,730 | 9/1966 | Feild | 264/174 |
| 3,474,652 | 10/1969 | Marcovitch | 72/190 |
| 3,483,288 | 12/1969 | Paulson | 264/328.12 |
| 3,523,147 | 8/1970 | Hold et al. | 264/68 |
| 3,616,495 | 11/1971 | Lemelson | 425/155 |
| 3,643,485 | 2/1972 | Marcovitch | 72/96 |
| 3,833,694 | 9/1974 | Hughes | 264/71 |
| 3,847,525 | 11/1974 | Bielfeldt et al. | 264/68 |
| 3,981,838 | 9/1976 | Wilson | 264/211 |
| 4,029,454 | 6/1977 | Monnet | 425/812 |
| 4,098,772 | 7/1978 | Bonk et al. | 264/331.19 |
| 4,120,922 | 10/1978 | Lemelson | 425/145 |
| 4,124,308 | 11/1978 | Sokolow | 264/328.12 |
| 4,141,953 | 2/1979 | Kepes et al. | 264/340 |
| 4,198,461 | 4/1980 | Keller et al. | 264/69 |
| 4,210,616 | 7/1980 | Echardt et al. | 264/255 |
| 4,285,751 | 8/1981 | Feinberg et al. | 186/242 |
| 4,288,398 | 9/1981 | Lemelson | 264/70 |
| 4,349,504 | 9/1982 | Kubat et al. | 264/328.17 |
| 4,403,069 | 9/1983 | Keller et al. | 264/23 |
| 4,429,061 | 1/1984 | Ide | 264/54 |
| 4,469,649 | 9/1984 | Ibar | 264/70 |
| 4,481,324 | 11/1984 | Hall et al. | 264/213 |
| 4,542,054 | 9/1985 | Fillmann | 264/328.12 |
| 4,851,167 | 7/1989 | Marc | 423/389 |
| 4,925,161 | 5/1990 | Allan et al. | 264/69 |
| 5,213,732 | 5/1993 | Jevtic | 264/71 |

FOREIGN PATENT DOCUMENTS

| | | | |
|---|---|---|---|
| 2205727 | 8/1973 | Germany. | |
| 2414819 | 10/1975 | Germany. | |
| 2513594 | 10/1976 | Germany. | |
| 2614213 | 10/1977 | Germany. | |
| 351715 | 9/1972 | U.S.S.R. | 425/456 |
| 398395 | 2/1974 | U.S.S.R. | 425/456 |
| 1350017 | 11/1987 | U.S.S.R. | 425/456 |
| 1009654 | 11/1965 | United Kingdom. | |
| 1067100 | 5/1967 | United Kingdom. | |
| 1175359 | 12/1969 | United Kingdom. | |
| 1189141 | 4/1970 | United Kingdom. | |
| 1213329 | 11/1970 | United Kingdom. | |
| 1220213 | 1/1971 | United Kingdom. | |
| 1463687 | 2/1977 | United Kingdom. | |
| 2008023 | 5/1979 | United Kingdom. | |
| 2085461 | 4/1982 | United Kingdom. | |
| 2152983 | 8/1985 | United Kingdom. | |
| 2170142 | 7/1986 | United Kingdom. | |

VIBRATING WALL SURFACES FOR MOLDING DEFORMABLE MATERIALS

CROSS REFERENCE INFORMATION

This is a continuation-in-part of U.S. patent application Ser. No. 07/880,926, which was filed on May 11, 1992 and is now U.S. Pat. No. 5,306,129, of co-pending U.S. application Ser. No. 08/124,147 entitled "Transforming the Physical Characteristics of a Moldable Material", and of co-pending U.S. application Ser. No. 08/138,673 entitled "Molding Apparatus and Method of Using the Same".

FIELD OF THE INVENTION

The present invention relates to a method and apparatus for controlling and/or altering the physical characteristics of a deformable material. Particularly, the invention pertains to a method and apparatus for shaping, and/or directing the flow of, a deformable material, by the implementation of a vibrating wall surface, to control and/or modify the molded product's physical properties. This vibrating wall surface can, among other things, exert a stress tensor onto a moldable material prior to, and/or in the course of, it solidifying. This invention also pertains to a molded product resulting from being subjected to the vibration process as disclosed herein.

BACKGROUND OF THE INVENTION

The processing of deformable materials generally involves the transformation of a starting material (i.e., in a solid state or a liquid state), which is in a random form (e.g., powder, beads, granules, pellets, etc.), into a final or intermediate product having a specific shape, dimensions and properties. Processes useful in the transformation of deformable materials from their initial random form to the form of the final or intermediate product are well known to those skilled in the materials processing industry. For instance, if the deformable material is a plastic, examples of such plastic transformation processes include, but are not limited to, extrusion molding processes, transfer molding processes, calendaring processes, laminating processes, thermoforming processes, injection molding processes, compression molding processes, blow molding processes, and the like.

As used herein, such transformation processes and/or operations are collectively referred to as "molding" processes. Similarly, the resulting final or intermediate product is referred to herein as the "molded" product, regardless of the specific transformation process employed in its manufacture. The materials processing industry is abundant with teachings in this field of technology.

Most of the conventional molding processes include at least the following steps: (a) transporting an unmolded, deformable material to a molding device (e.g., a mold or die), (b) heating the unmolded, deformable material until it can be deformed to take the geometric configuration of the mold or die, (c) shaping the heated material to the geometric configuration of the mold or die to form a molded product, and (d) cooling the molded product. These steps can be done either in sequence, or simultaneously, or a combination of both. Moreover, it is not necessary to perform these steps in the aforementioned order.

In order to produce molded products having a specific geometric configuration, it is generally necessary to employ a mold or die defining the same geometric configuration. The primary objective of a mold or die is to shape the deformable material introduced therein. Sometimes, molds and dies have a secondary objective, this being to cool the deformed material therein until it is able to maintain its shape when the molded product is withdrawn therefrom.

The physical properties of a molded product depend, in part, upon the specific molding process conditions and steps employed. It has been observed that different molding processes will often result with the final or intermediate products having different physical properties. For example, the amount of shear stress and/or hydrostatic force exerted onto a deformable material during the particular molding process determines, in part, the degree of molecular orientation and crystallization within the resulting molded product. This, in turn, has an effect on the molded product's physical properties.

Since there is a need to be able to produce molded products which have physical properties within particular ranges, if a method can be devised for controlling at least some of these physical properties (e.g., by controlling the degree of shear stress, hydrostatic force, etc.), both the process, and the product resulting therefrom, will be greatly welcomed in the molding industry.

One method of controlling the amount of shear stress, hydrostatic force, and the like, in a molded product (and thereby controlling some of the product's physical properties), is commonly referred to as "flow technology". The concept of flow technology, as it relates to plastic molding processes, is concerned with the behavior of a deformable plastic material before, or while, it is being introduced into a mold and/or being passed through a die.

It has been discovered that the properties of a final or intermediate molded product depend, at least in part, upon how the deformable material flows prior to, and/or while, being subjected to a molding process. For example, two products, having identical dimensions and made from the same basic starting material, but which are molded under different conditions (e.g., they were subjected to different hydrostatic forces and/or shear stresses), and subjected to different flow patterns, will probably have different physical properties.

This phenomena is due, in part, to the fact that, as a deformable material flows prior to, or while, entering a mold or passing through a die, it is subjected to a shear stress which is commonly referred to herein as "flow shear stress".

Flow shear stress induces molecular orientation in the plastic material (i.e., it results in the macromolecules aligning themselves in the direction of flow). The flow shear stress varies from a maximum level at the outside surface of the flowing deformable material to a minimum level at the center where the material is last to cool.

The rate of flow is very important to the determination of the frozen-in molecular orientation in the molded product. This is due, in part, to the amount of relaxation which takes place while shear stresses reorganize the molecular interaction between the macromolecules.

From the above it can be seen that the manner in which the deformable material flows into a mold or through a die, or the manner in which it flows prior to being subjected to a specific molding process, is of extreme importance in determining the physical properties of the final molded product due, in part, to the degree of flow shear stress which will be imparted thereto.

If a method can be devised for controlling the degree of molecular orientation resulting from flow shear stress, it would be greatly welcomed in the molding industry, since it will enable the manufacturer to have a greater degree of control over the product's final properties.

As is well-known in the molding industry, during the compensating phase of a typical injection-molding process, the flow of a deformable material into the mold is generally unstable due to the flow occurring in "rivers" which spread out in a delta-like manner. The first material to freeze off shrinks early in the cycle. By the time the material freezes in these rivers, the bulk of the material is frozen up and the shrinkage has already occurred. Therefore, the rivers shrink relative to the bulk of the molded article.

Since the rivers are highly oriented, shrinkage can be very high. This, in turn, can result in high degrees of stress inside the molded part which can, for example, be a source of warpage. Accordingly, if a means can be devised which reduces the degree of shrinkage from these rivers and, thus, reduces the degree of warpage in the final product, it would also be greatly welcomed in the molding industry.

It has also been discovered that the micro structures and the morphology of a molded product (e.g., molecular orientation, degree of crystallinity, etc.) are greatly influenced by the thermo-mechanical history experienced by a deformable material during its molding process steps. And, as can be expected, the ultimate properties of the molded product are closely related to the deformable material's morphology and micro structure.

Specifically, according to U.S. Pat. No. 4,469,649, which is incorporated herein by reference, the control of a material's transformation process, from its random form to its final molded form, can be made at least partially dependent upon the rheological properties of the plastic material as it is subjected to specific molding techniques.

If a method can be devised to control the micro structures and the morphology of a molded deformable product, it would be greatly welcomed in molding industry.

As can be seen from the above, while molded products (e.g., plastics) play a significant role in our daily lives, and are expected to play an even more important role in our future, there are many problems in the manufacturing of such products which still remain unsolved.

SUMMARY OF THE INVENTION

Accordingly, it is one object of the present invention to provide a means for improving the physical properties of a molded product which has been subjected to a specific molding process by controlling the amount of shear stress and/or hydrostatic force applied during the molding process.

Another object of this present invention is to provide a new flow technology concerned with the behavior of deformable materials during the transformation process from their initial form to their final molded form.

It is yet another object of the present invention to subject a mold, die or transfer channel surface, to a novel vibrational treatment to control the manner in which a deformable material flows into or through the mold, die or transfer channel. This novel vibrational treatment accomplishes at least one of the following objectives: (a) it eliminates at least some of the presence of rivers resulting within the molded product; (b) it minimizes the degree of shrinkage during the solidification stage of the molding process; and/or (c) it controls the degree of crystallinity, the macrostructure, and/or the orientation in the amorphous regions.

It is even another object of ,this invention to provide a novel mold, die or transfer channel surface which provides, in a material being molded therein and/or passed therethrough, an optimum degree of orientation through shear plastic yielding occurring during and/or just before the solidification stage of the molding process.

It is still another object of this invention to provide a novel mold, die or transfer channel surface which can influence the way that a deformable material flows therein or therethrough, thereby altering the physical properties of the molded product.

It is a further object of this invention to provide an extrusion molding apparatus, an injection molding apparatus and/or a blow molding apparatus, each having the capability of altering the physical properties of a deformable material molded therewith by incorporating a vibrating wall assembly.

It is even a further object of this invention to implement a mold, die or transfer channel having a novel vibrating surface design, with the molding technology disclosed in U.S. Pat. No. 4,469,649, in order to improve the physical properties of a molded product by controlling the manner in which a deformable material flows into a mold and/or through a die or transfer channel.

It is still a further object of this invention to implement a mold, die and/or transfer channel, having a novel vibrating surface design, with the molding technology disclosed in U.S. Pat. No. 4,919,870 (also incorporated herein by reference).

These and other objects are met by the present invention which pertains in part to an apparatus for shaping, and/or directing the flow of, deformable materials during molding processes. One of the features of this shaping apparatus is a novel vibrating wall assembly.

In the present invention, a deformable material passes over at least a portion of this novel vibrating wall assembly. Then, by controlling the amount, frequency and/or amplitude of the wall assembly's vibration, the physical properties and characteristics of the resulting molded product can be controlled and/or modified such that they fall within specified, predetermined parameters.

The novel vibrating wall assembly of this present invention is basically in the form of a vibrating lining. This vibrating lining is designed to follow the contours of at least a portion of the mold's, die's or transfer channel's cavity. Accordingly, in order to practice this invention, there must first be provided a mold, die of transfer channel which is designed to accommodate the vibrating wall assembly disclosed herein.

This vibrating wall assembly comprises a pliable wall positioned within the mold, die or channel. The positioning of this pliable wall is such that its outside wall surface is adjacent to at least a portion of the mold's, die's or channel's inside wall surface; and its inside wall surface will ultimately define the geometric configuration of the deformable material passing thereover.

This pliable wall is designed to deform from its original shape when a positive or negative pressure is exerted thereon. Generally, the positive pressure is exerted by the deformable material flowing over the pliable wall's inside wall surface.

Conversely, this pliable wall is also designed to create a temporary deformation in the deformable material in contact therewith when a positive or negative pressure is exerted on its outside wall surface. In accordance with this invention, the pressure is exerted on the pliable wall's outside wall surface by the displacement of a displaceable fluid. This displaceable fluid is contained within a displaceable fluid chamber. The displaceable fluid chamber is in communication with at least a portion of the pliable wall's outside wall surface such that the displaceable fluid results in a deformation in at least a portion of the pliable wall's inside wall surface.

The vibrating wall assembly also comprises a device designed to displace the fluid contained within the displaceable fluid chamber. The displacement device employed in this invention can control the amount, frequency and/or amplitude of the wall assembly's vibration by controlling the displacement of the displaceable fluid.

Other objects, aspects and advantages of the present invention will become more apparent to those skilled in the art upon reading the following detailed description, when considered in conjunction with the appended claims and the accompanying drawings briefly described below.

DEFINITIONS

The term "frequency", as used herein, refers to the number of cycles one specific region of a bladder vibrating in accordance with this invention oscillates per second.

The term "amplitude", as used herein, refers to the maximum longitudinal distance traveled by one specific region of a bladder vibrating in accordance with this invention during one-half of an oscillation cycle.

The term "phase", as used herein, refers to the relative motion of one specific region of a bladder vibrating in accordance with this invention with respect to another specific region of a bladder also vibrating in accordance with this invention.

The term "stress tensor", as used herein, refers to a matrix exerted onto a deformable material by the vibrating wall assembly during a molding process. This matrix comprises a hydrostatic force component and shear stress components.

DETAILED DESCRIPTION OF THE INVENTION

The present invention provides a novel apparatus which is useful for shaping, and/or directing the flow of, deformable materials. Specifically, this novel apparatus comprises at least one vibrating wall assembly over which a deformable material passes.

In accordance with the present invention, a deformable material passes over at least a portion of this novel vibrating wall assembly. The vibrating wall assembly of this invention is in the form of a lining layer. Therefore, when practicing this invention, it is necessary to design a mold, die or transfer channel body such that it can accommodate and/or define the vibrating wall assembly disclosed herein. Those skilled in the art would be able to design such a mold, die or transfer channel body after reading this specification. As will be seen when the figures are explained, the predominant geometric configuration of the mold, die or transfer channel body cavity, including that portion defined by the vibrating wall assembly, is that of the resulting molded product.

In addition to the appropriately designed mold, die or transfer channel body, the vibrating wall assembly of the present invention includes a pliable wall incorporated therein such that the wall defines at least a portion of that mold's, die's or channel's cavity. The positioning of this pliable wall is such that its inside wall surface defines at least a portion of the deformable material's outside wall surface. Therefore, the pliable wall's inside wall surface should be textured appropriately.

Figure 9:
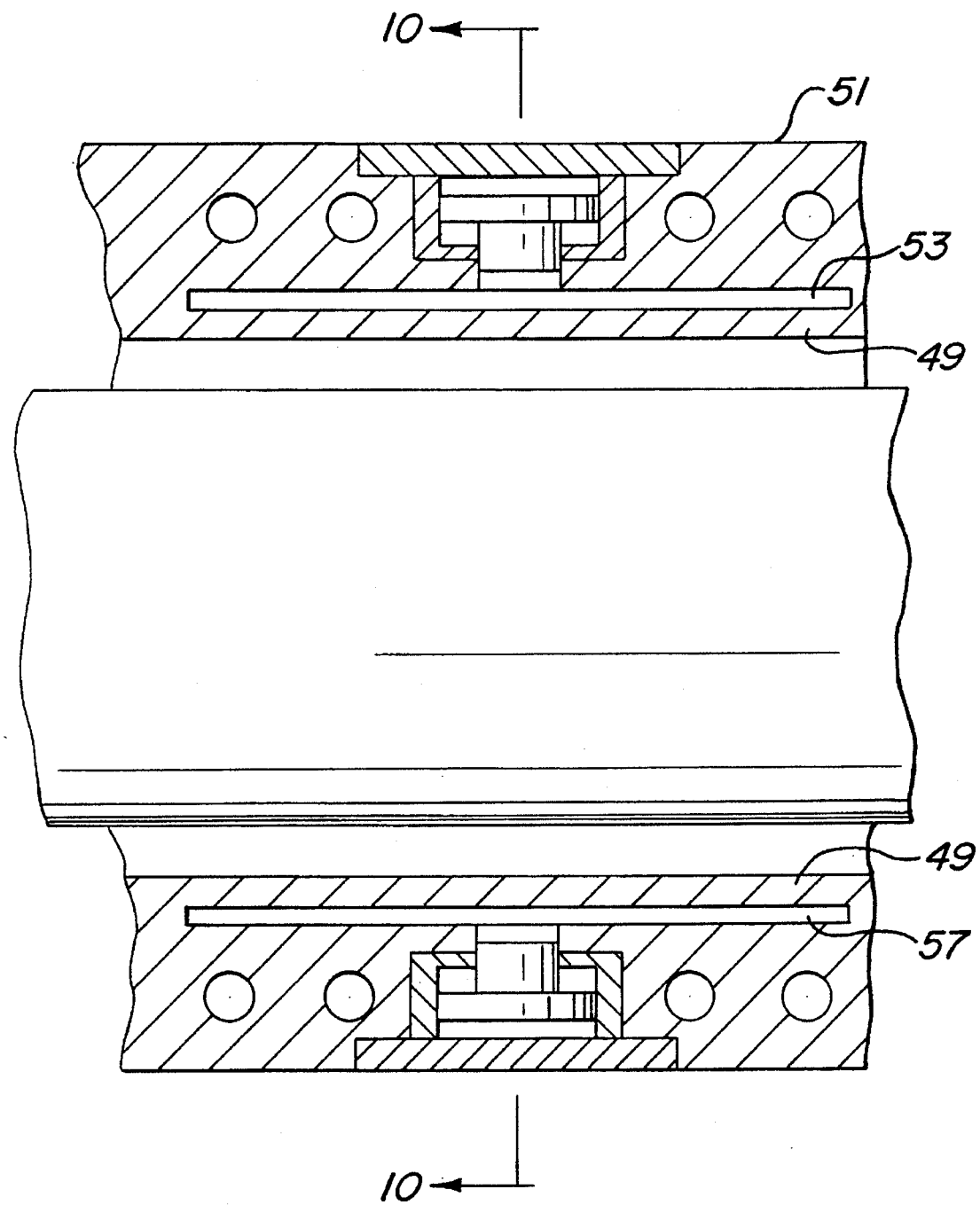
FIG. 9 is a cross-sectional view of an extrusion die or a transfer channel which includes one embodiment of the novel vibrating wall assembly encompassed by this invention.
Figure 10:
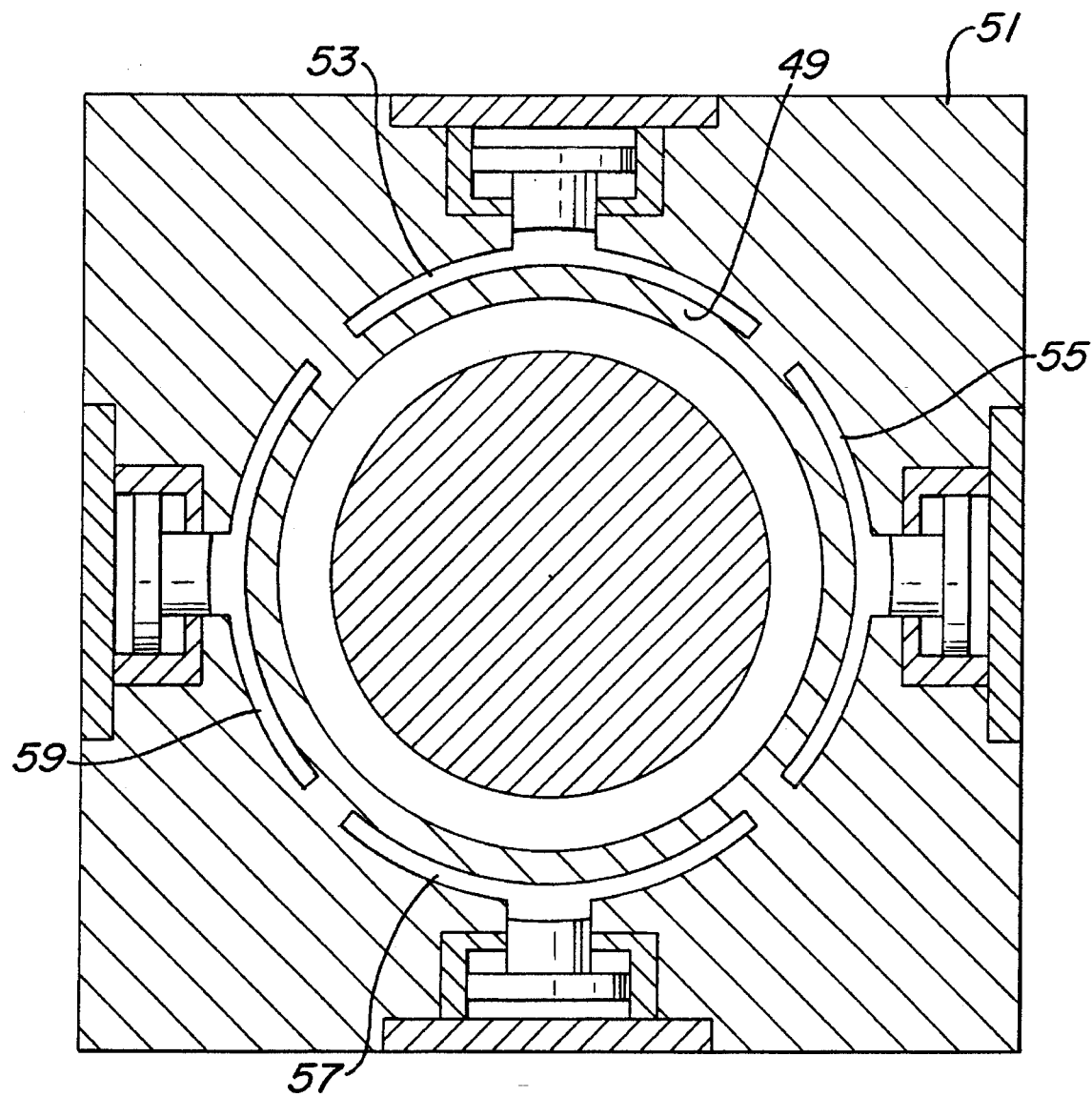
FIG. 10 is a cross-sectional view of the die or channel illustrated in FIG. 9, taken along line 10—10.

The pliable wall can be in the form of a liner (see, e.g., FIGS. 1–4) or incorporated as part of the mold's body (see, e.g., FIGS. 9 and 10). In either of these instances, this pliable wall serves as a "bladder". Accordingly, the terms "pliable wall" and "bladder" are used herein interchangeably.

When practicing this invention, the bladder must be designed such that it can withstand the environmental conditions encountered within a mold, die or transfer channel during a particular molding process. In addition to being able to withstand such molding conditions, the bladder must be pliable such that it can be moved back and forth when a positive and/or negative pressure is exerted onto its outside and/or inside wall surface.

It is expected that the continual back and forth movement of a bladder vibrating in accordance with this invention will, over time, reduce the bladder's ability to withstand a particular set of molding conditions. Accordingly, the bladder must be designed such that it can withstand the molding and vibrating conditions of at least one complete molding process cycle.

In accordance with this invention, the bladder may be made from any suitable material which possesses at least the aforementioned characteristics. Since the environmental conditions encountered in a process vary, and since the frequency and amplitude of vibration to which a bladder is subjected also vary, the preferred material from which the bladder is made will differ. Those skilled in the art will be able to select the bladder material which best suits their needs after reading this specification, and after selecting the specific molding and vibration conditions to which the bladder will be subjected.

The environmental conditions encountered in many conventional molding and/or transfer processes which can be modified by employing this invention include, without limitation, pressures ranging from between about 100 psi to about 20,000 psi, and preferably from between about 100 psi to about 12,000 psi. Moreover, the temperatures encountered in many molding and/or transfer processes typically range from between about 20° C. to about 400° C. The vibration conditions which will be encountered in many molding and/or transfer processes practiced in accordance with this invention will be discussed later.

Notwithstanding the above, some examples of materials which are particularly suitable for making the bladder used when practicing this invention include, without limitation, synthetic materials, polymeric materials, reinforced leathers, metallic sheets and/or any combination thereof. Specific examples include, without limitation, composite reinforced synthetic skins, reinforced leather skins, stainless steel sheets, and/or any combination thereof.

If stainless steel sheets are employed, it is presently preferred to employ such sheets which can be heat-treated to increase their strength. Examples of such stainless steel sheets include, without limitation, 400 series stainless steel (e.g., 410, 414, 416 and 420) and 17-4PH stainless steel. As indicated above, the preferred material(s) from which to make the bladder will depend, in part, upon the specific environmental conditions encountered and the desired results.

The shape, size and thickness of the bladder is also determined, at least in part, by the specific molding process employed. Other factors which must be taken into consideration when determining the shape, size and thickness of the bladder include, without limitation, the location of the bladder within the mold, die or transfer channel, the amplitude at which the bladder is to travel, the frequency at which the bladder is oscillated and the material from which the bladder is made.

U.S. Pat. No. 4,469,649 states, among other things, that changing the frequency and/or amplitude of vibration to which a material is subjected, while the material is being molded and while at least one other rheological parameter (e.g., the material's temperature) is also being altered, changes the physiological properties of the resulting molded product. As stated earlier, U.S. Pat. No. 4,469,649 is incorporated herein by reference. Accordingly, the frequency and amplitude at which a portion of the bladder oscillates will vary depending, in part, upon the desired physiological properties of the resulting molded product. In view of the above, the preferred size, shape and thickness of the bladder will vary. However, once it has been decided into what molding process the vibrating wall assembly is to be employed, and what vibration pattern the vibrating wall assembly is to be subjected, those skilled in the art will be able to select the bladder's optimum size, shape and thickness which best suits their needs.

As indicated above, the bladder's inside wall surface defines at least a portion of the moldable material's surface. Accordingly, the bladder's inside wall surface can be smooth or textured. However, it is also within the purview of this invention to have a coating material or layer (e.g., a film) over the bladder's inside wall surface.

Any suitable coating material can be employed. The specific coating material and/or its texture, if any, will depend, in part, upon the desired function sought thereby. For example, in some instances it is desirable to coat the bladder's inside wall surface (i.e., the surface which will contact the deformable material) with a material which minimizes sticking. Under these circumstances, a suitable non-stick coating material can be employed. Examples of suitable non-stick coating materials include, without limitation, polytetrafluoroethylene, polybichloril-difluoril-ethylene and metallic alloy coatings known for their low friction, and/or any combination thereof.

The oscillating movement of the bladder results, at least in part, by the corresponding displacement of a displaceable fluid. This displaceable fluid is confined within a displaceable fluid chamber. The displaceable fluid chamber can be a chamber which is in fluid communication with at least a portion of the bladder's outside wall surface. This chamber can also be a deformable conduit, tube and/or pouch. Such a conduit tube or pouch can be either adjacent to, or incorporated within, the bladder.

In one specific embodiment of this invention, at least a portion of the fluid displacement chamber is defined by the bladder being positioned adjacent to, but spaced apart from, that portion of the mold's, die's or transfer channel's inside wall surface. Examples of apparatuses which incorporate this embodiment of the invention are illustrated in FIGS. 1–4 and 9–13.

In this embodiment of the invention, the outside wall surface of the bladder and the inside wall surface of the mold, die or transfer channel defines at least a portion of the chamber which is designed to contain a displaceable fluid. The size and shape of this chamber will depend, in part, upon its location, and the degree and/or extent of vibration desired.

Figure 1:
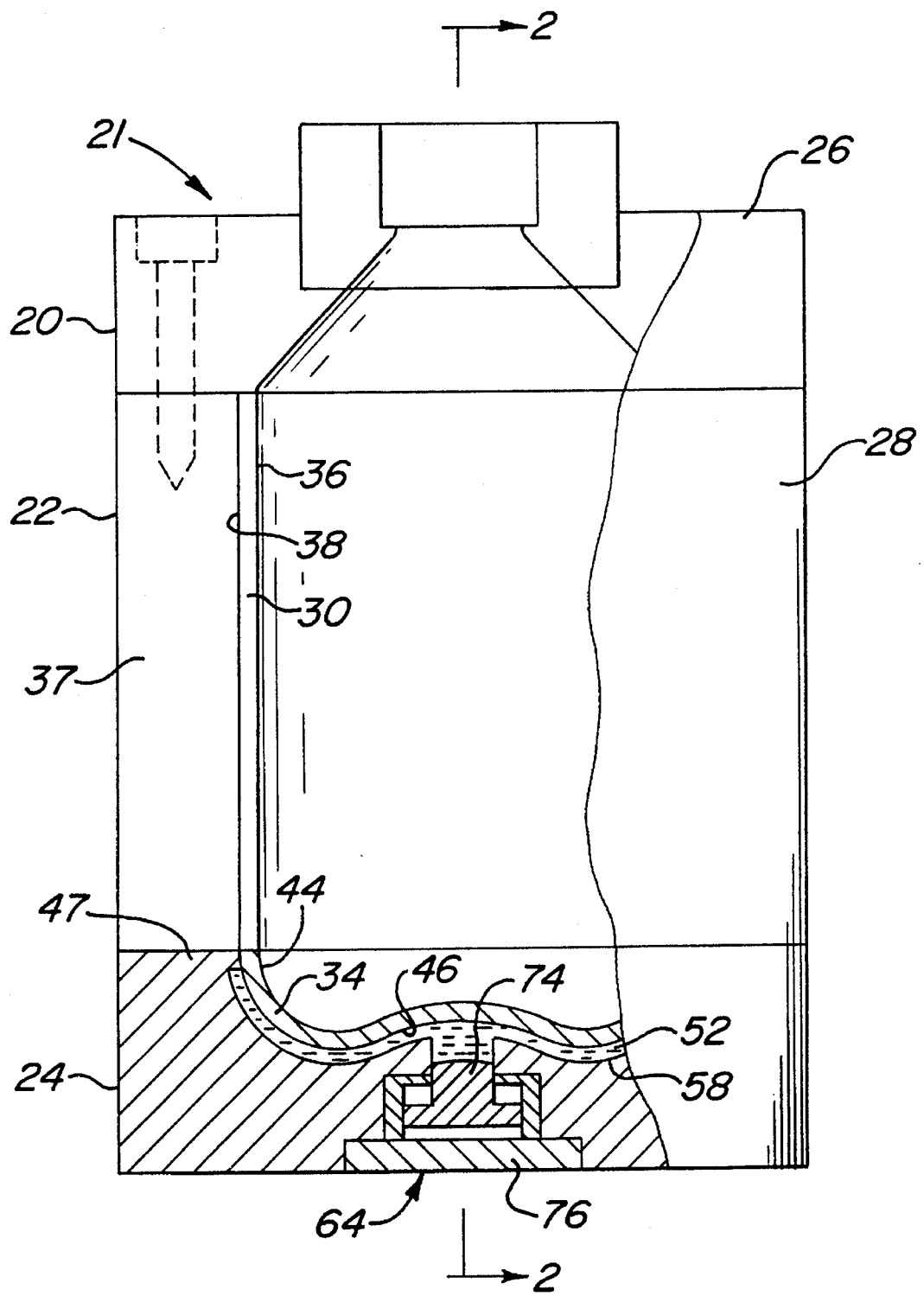
FIG. 1 is frontal, partially sectioned and partially cross-sectioned view of a mold designed for use in a blow molding apparatus which includes one embodiment of the novel vibrating wall assembly encompassed by this invention.

For example, FIG. 1 illustrates an apparatus having a fluid displacement chamber which is designed such that it contacts a continuous portion of a portion of the bladder's outside wall surface. However, it is also within the purview of this invention to employ a fluid displacement chamber which includes baffles such that it only contacts specific portions of the bladder's outside wall surface (see, e.g., FIG. 13). Accordingly, after reading this specification, those having an ordinary skill in the art will know how to position and/or design the bladder in order to obtain the results which best suits their needs.

In another embodiment of this invention, the bladder is not spaced from that portion of the mold's, die's or transfer channel's inside wall surface to which it is adjacent. One example of an apparatus which incorporates this embodiment is illustrated in FIGS. 5–8. As can be seen in this latter embodiment, a majority of the bladder's outside wall surface rests against the mold's inside wall surface. As with the embodiment of this invention which employs a baffled displacement fluid chamber, this latter embodiment also affords one the ability to concentrate the vibration to a very specific location.

In any of the embodiments of the invention, the bladder is designed such that it can be displaced from the inside wall surface of the mold, die and/or transfer channel by the exertion of a positive pressure on the bladder's outside wall surface. This positive pressure is generated by the displacement of a displaceable fluid contained within the fluid displacement chamber.

In the former embodiment, the displaceable fluid is contained within the fluid displacement chamber defined, at least in part, by the spaced-apart placement of the inside wall surface of the mold, die and/or transfer channel and by the outside wall surface of the bladder. However, in the latter embodiment, since the bladder's outside wall surface rests against the mold's, die's or transfer channel's inside wall surface, the displaceable fluid is contained within an auxiliary fluid displacement chamber. This auxiliary fluid displacement chamber is defined, at least in part, by a portion of the bladder's outside wall surface.

As stated earlier, the configuration, size, shape, number and placement of the displaceable fluid chambers depend, in part, upon the desired results, the configuration and size of the mold, die and/or transfer channel, and the size, shape and thickness of the bladder. Examples of different displaceable fluid chambers are illustrated in FIGS. 4, 8, 10, 12 and 13.

Figure 5:
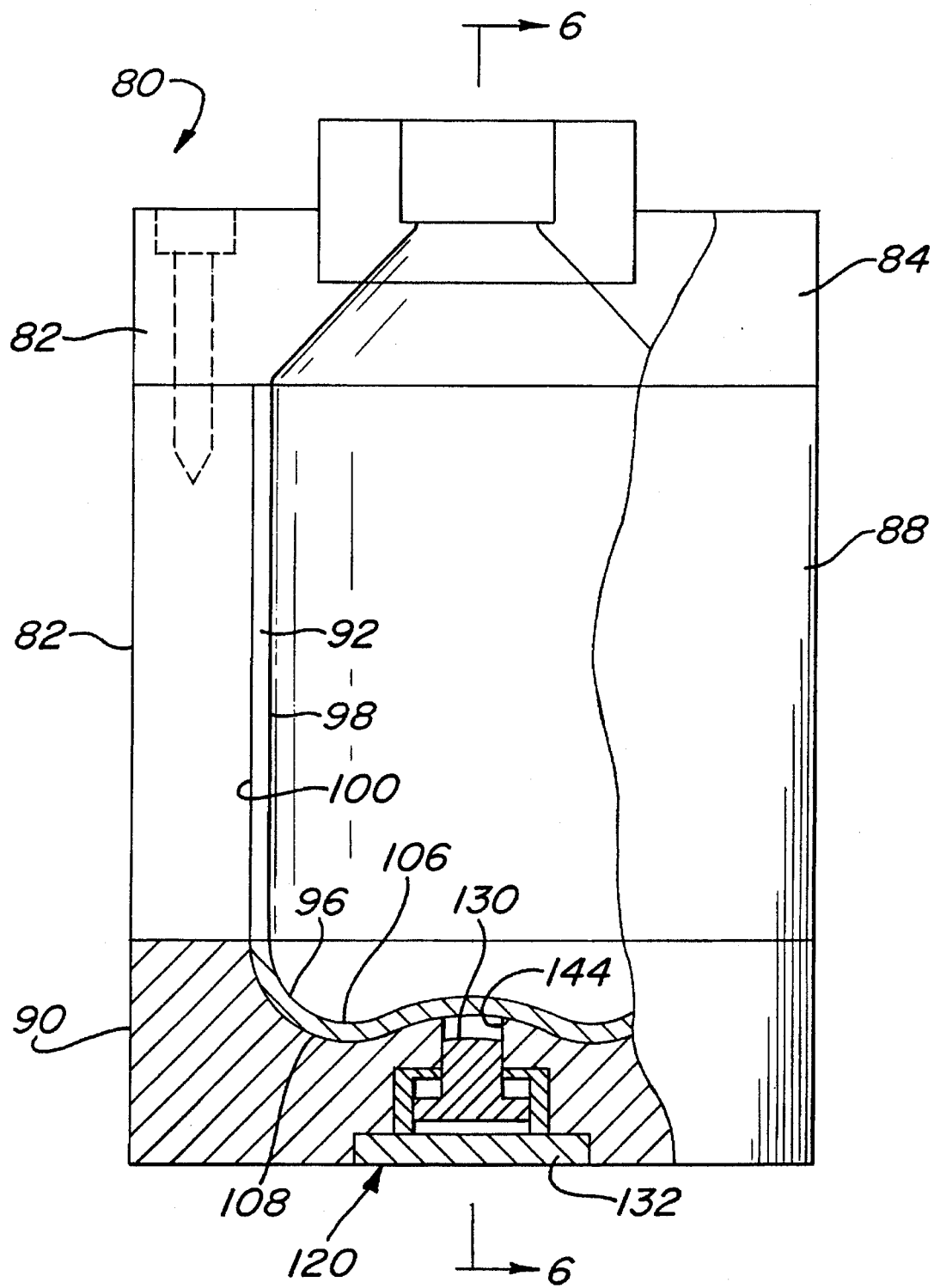
FIG. 5 is frontal, partially sectioned and partially cross-sectioned view of a mold designed for use in a blow molding apparatus which includes another embodiment of the novel vibrating wall assembly encompassed by this invention.

The vibrating wall assembly of this invention also includes a means for displacing a fluid contained within the displaceable fluid chamber(s). This fluid displacing means is designed to indirectly exert a positive and/or negative pressure onto at least a portion the bladder's outside wall surface such that a deformation of the bladder's inside wall surface results. This deformation, in turn, deforms the specific geometric configuration defined by the vibrating wall assembly (e.g., the specific geometric configuration defined in FIGS. 1 and 5 is a bottle). Accordingly, when a moldable material is contained within and/or passing through the mold, die or transfer channel, the deformation in the bladder's inside wall surface will exert a corresponding hydrostatic force on the moldable material in contact therewith.

Any suitable device can be employed as the fluid displacing means. Examples of suitable fluid displacing means include, without limitation, mechanical displacing devices, electronic displacing devices, magnetic displacing devices, electro-magnetic displacing devices, hydraulic displacing devices, pneumatic displacing devices, solenoid-type displacement devices, and Piezoelectric displacing devices, and the like, and/or any combination thereof. The preferred fluid displacement means depends, in part, upon the resources available to the person(s) practicing the invention.

The specific fluid displacing means illustrated in FIGS. 1–13 includes a drivable member which is reciprocable within, and relative to, a cylinder. In one embodiment of this invention, this cylinder is in direct communication with the displaceable fluid chamber (see, e.g., FIGS. 1–4). In another embodiment of this invention, this cylinder is, per se, the displaceable fluid chamber (see, e.g., the auxiliary fluid displacement chamber) illustrated in FIGS. 5–8.

If employing the fluid displacement means illustrated in FIGS. 1–13, the drivable member, and its respective cylinder, can have any configuration which enables one to practice this invention. Moreover, the drivable member can be reciprocated within its corresponding cylinder by any suitable means. Examples of such suitable means include, without limitation, hydraulic reciprocating devices, pneumatic reciprocating devices, mechanical reciprocating devices, electronic reciprocating devices, electromagnetic reciprocating devices, solenoid-type reciprocating devices, Piezoelectric reciprocating devices, and the like, and/or any combination thereof. The preferred method of reciprocating the drivable members will depend, in part, upon the resources available to the person practicing this invention, and the type of drivable member selected.

The displaceable fluid used when practicing this invention can be in the form of a liquid, a fluidized bed of particles, a gel or a gas. When selecting the appropriate displaceable liquid, it is important to consider the desired frequency and amplitude conditions. For example, the response time of displacing the displaceable fluid must be such that it will adequately respond to the desired frequency and amplitude parameters associated with the predetermined vibration treatment.

If a liquid or gel is employed as the displaceable fluid, it is presently preferred to employ a fluid which will not boil when subjected to the temperature and pressure conditions encountered by the vibrating wall assembly during a particular molding process. Specifically, in order to produce reproducible results, it is important to control the degree and amount of vibration. However, if a displaceable fluid is employed which boils during the molding process, it would be difficult to determine how this boiling will affect the vibration treatment. Moreover, it would also be difficult to reproduce the exact same vibrational affect.

Accordingly, in situations where the temperature and pressure conditions fall within the parameters set out earlier, examples of suitable gel or liquid displacement fluids include, without limitation, water, organic or mineral filled or unfilled oils, filled oils with powders, silicon oils, cured or uncured silicon gels, swellable porous foams or gels, and fluidized particles, and the like, and/or any combination thereof.

The preferred displacement fluid depends, in part, upon the desired results, the molding apparatus employed, the size, shape and number of displacement fluid chambers and the size, shape, composition and thickness of the bladder. Those of ordinary skill in the art will be able to select the displacement fluid which best suits their needs after reading this specification.

When the present invention is practiced, a deformable material is introduced into the cavity of the mold, die or transfer channel body, which is defined, at least in part, by a vibrating wall assembly as disclosed herein. This deformable material can be introduced into the mold, die or transfer channel body by any suitable conventional introduction means.

It is also within the purview of this invention to introduce this deformable material into the mold, die or transfer channel body by an apparatus which has an accumulator chamber interposed between the feeder and the mold, die or transfer channel. This accumulator is in fluid communication with the feeder and the mold, die or transfer channel. Moreover, this accumulator is designed to introduce a deformable material into a mold, die or transfer channel in a manner such that it exerts shear stresses, a hydrostatic force or stress tensor thereon.

Regardless of the manner in which the deformable material is introduced into the mold, die or transfer channel, after being introduced therein, the deformable material comes into direct contact with the vibrating wall assembly's inside wall surface. As this material is in contact with the vibrating wall assembly, the assembly's fluid displacement means exerts a preprogrammed series of positive and/or negative pressures onto the displacement fluid contained within a particular displacement chamber. The pressurized displacement fluid, in turn, causes the bladder's outside wall surface to deform. This deformation produces a hydrostatic force on the deformable material in contact with the bladder's inside wall surface.

As can be seen, if a single vibrating wall assembly is employed, the shaping apparatus can be used to generate a series of hydrostatic force pulses on a deformable material. However, if it is desirable to generate shear stresses or a stress tensor onto the deformable material, it is necessary to employ at least two fluid displacement means. Moreover, it is also necessary for these two fluid displacement means to be either in communication with spaced-apart regions of the same bladder, or in communication with separate bladders which are at spaced-apart regions within the mold's, die's or transfer channel's cavity.

If at least two fluid displacement means are employed, and if each displacement means comprises a drivable member which is reciprocable within, and relative to, a cylinder, the plurality of fluid displacement means can manipulate the moldable material by reciprocating the drivable member of each fluid displacement means, with respect to the other drivable member, in at least one of the following manners: (a) at the same frequency, at a different amplitude and out of phase with each other, (b) at the same frequency, at a different amplitude and in phase with each other, (c) at the same frequency, at the same amplitude and out of phase with each other, (d) at the same frequency, at the same amplitude and in phase with each other, (e) at a different frequency and at the same amplitude, and (f) at a different frequency and at a different amplitude. Moreover, it is also within the purview of this invention that, while the deformable material is being manipulated by the vibrating wall assembly in one of the aforementioned manners, the frequency, amplitude and/or phase shift of the fluid displacement means' drivable members can remain constant, be variable and/or be intermittent throughout the molding process.

When practicing this invention, the fluid displacement means can be designed to vibrate the bladder at any suitable frequency. The preferred frequency will depend, at least in part, upon the number of fluid displacement means, the amplitude to which the bladder is vibrated, the location of the fluid displacement means, the location, size, shape and configuration of the fluid displacement chamber(s), and the desired effects on the resulting molded product. Those skilled in the art, after reading this specification, will be able to determine the optimum frequency which best suits their specific needs.

Notwithstanding the above, the frequency (f) at which the bladder is vibrated typically ranges from between about 0.5 to about 120 Hz. Preferably, the drivable members are reciprocated at a frequency ranging from between about 1 to about 50 Hz, and more preferably, from between about 1 to about 80 Hz.

When practicing the present invention, the fluid displacement means can be designed to vibrate the bladder to any suitable amplitude. The preferred amplitude will depend, at least in part, upon the number of fluid displacement means, the frequency at which the bladder is vibrated, the location of the fluid displacement means, the location, size, shape and configuration of the fluid displacement chamber(s), and the desired effects on the resulting molded product. Those skilled in the art, after reading the specification, will be able to determine the optimum amplitude which best suits their specific needs.

Notwithstanding the above, the amplitude (a) at which the bladder is vibrated is such that it generates a hydrostatic force onto the deformable material in direct contact with the vibrating wall assembly ranging from between about 100 to about 20,000 psi. Preferably, the bladder is vibrated at an amplitude such that it generates a compressive force onto the deformable material ranging from between about 100 to about 15,000 psi, and more preferably, from between about 100 to about 10,000 psi.

When practicing this invention, the vibrating wall assembly can be employed to exert a specific stress tensor onto a deformable material. As stated earlier, a stress tensor comprises shear stress components and a hydrostatic force component. In order for the vibrating wall assembly to exert a stress tensor onto the deformable material, there must be at least two fluid displacement means. These fluid displacement means must be in communication either with spaced-apart region of the same bladder, or with separate bladders which are at spaced-apart regions within the mold's, die's or transfer channel's cavity.

When employing the vibrating wall assembly to exert a stress tensor onto a deformable material, it is presently preferred to separately monitor and control the stress tensor's individual components (i.e., shear stresses and hydrostatic force). The shear stress components affect the orientation of the deformable material, wherein the hydrostatic force component affects, among other things, the material's temperature, nucleation and growth process of crystal formation. The proper mixture of these components, in time, as the frequency, amplitude and phase of the vibrating bladder regions are varied, results in an original history pattern which modifies the morphology, and thus, the physical properties of the resulting molded product.

In accordance with the embodiment of this invention wherein more than one fluid displacement means is employed, and wherein the spaced-apart bladder regions vibrate at the same frequency, their vibration patterns can be either "in phase" or "out of phase" with each other. The phase shift between the two drivable members, and thus their corresponding bladder regions, can range from 0 to 6.28 radians.

When the phase shift is at the values of 0 or 6.28 radians, the spaced-apart bladder regions are vibrated in phase with each other. On the other hand, when the phase shift is at an amount ranging from between a value slightly greater than about 0 radians to a value slightly less than 6.28 radians, the spaced-apart bladder regions are vibrated out of phase with each other.

The various spaced-apart bladder regions, which are vibrated at the same frequency, can also be vibrated at any suitable phase shift, or at none at all (i.e., in phase). The preferred phase shift will depend, at least in part, upon the number of fluid displacement means, the amplitude to which each bladder region is vibrated, the frequency at which each bladder region is vibrated, the location of the fluid displacement means, the location, size, shape and configuration of the fluid displacement chamber(s), and the desired effects on the resulting molded product. Those skilled in the art, after reading the specification, will be able to determine the optimum phase shift which best suits their needs.

Notwithstanding the above, when more than one bladder region is vibrated in accordance with this invention, and when the spaced-apart regions are vibrating out of phase with one another, the phase shift therebetween typically ranges from between about 0.79 to about 5.50 radians. Preferably, under this scenario, the various bladder regions vibrate at a phase shift ranging from between about 1.57 to about 4.71 radians, and more preferably, from between about 2.36 to about 3.93 radians.

The maximum phase shift between two separate bladder regions occurs when they are oscillating at 3.14 radians out of phase with each other. Accordingly, with all other variables being the same, the greatest amount of shear stress will result when the various bladder regions are vibrated at a phase shift of about 3.14 radians.

When practicing this invention, a specific frequency, amplitude and phase shift (if more than one vibrating bladder region is employed) is selected. These selected parameters are referred to herein as a specific "vibration pattern".

In accordance with the present invention, a vibration pattern can be designed to remain constant throughout the molding process. On the other hand, it is also within the purview of this invention to have this vibration pattern vary and/or be intermittent throughout the molding process. When the vibration pattern varies during the molding process, the frequency, amplitude and/or phase shift (when more than one vibrating bladder region is employed) can vary, for example, from a low value to a high value, or vice-versa. This variation can occur linearly, exponentially, randomly and/or intermittently (e.g., with a succession of programmed vibration pattern and no vibration pattern).

Moreover, if more than one vibrating bladder region is employed, the variants of vibration of one bladder region can be either the same or different from that of another. For example, a varying vibration pattern in accordance with the present invention can result from at least one of the following scenarios: (a) varying the parameters of only one vibrating bladder region, while those of all other bladder regions remain the same, (b) varying the parameters of at least two vibrating bladder regions at the same manner, and (c) varying the parameters of at least two vibrating bladder regions in different manners and/or any combination thereof.

Moreover, the design of the bladder can be specific to the vibration treatment which is to take place. Here, the dampening effects of the bladder are considered since they have a bearing on the frequency and amplitude of vibration.

As can be appreciated by those skilled in the art, there are many different vibration patterns which can be used when practicing this invention. Each pattern will modify the properties of the resulting molded product in its own specific manner. The preferred pattern will depend, in part, upon the desired end results.

After reading the specification, those skilled in the art will be able to determine the specific vibration pattern which best suits their needs through simple experimentation. For example, this can be done by noting the physical properties of a material which was molded in accordance with a particular vibration pattern.

Then, subsequent materials are prepared in accordance with the present invention wherein one of the stress exertion parameters (e.g., frequency, amplitude and/or phase shift) is changed. By comparing the morphological structure and/or physical properties of these subsequent materials with those of the first material, a skilled artisan can see how the variance of a specific stress exertion parameter affects the particular material's morphological structure. This information can be used to determine how the stress exertion parameter must be modified in order to produce a product having the desired morphological structure and/or physical properties. Once the parameters have been established, the results can be easily reproduced by using the same vibration pattern under similar conditions.

In the specific embodiments illustrated in the figures, the inside wall surface of bladder defines a specific geometric configuration (e.g., the bottom portion of a bottle in FIGS. 1 and 5). In these embodiments, each fluid displacement means employed comprises a drivable member (e.g., a piston) positioned within a corresponding cylinder. Each corresponding cylinder is in communication with a displaceable fluid. The displaceable fluid is, in turn, in communication with at least a portion of the bladder's outside wall surface.

In these embodiments, as the displacing devices exert a positive or negative pressure on the displaceable fluid, a similar pressure is exerted onto the bladder's outside wall surface by the displacement of the displaceable fluid. This, in turn, results in a temporary deformation of the specific geometric configuration defined by the bladder's inside wall surface.

The figures of the present invention illustrate, among other things, shaping apparatuses which employ novel vibrating wall assemblies encompassed by this invention. Each of these wall assemblies comprises a specific bladder configuration, a specific fluid displacement means, and a specific fluid displacement chamber. As stated earlier, any suitable bladder configuration, fluid displacement means and fluid displacement chamber configuration can be employed when practicing the present invention.

Also as stated earlier, the novel vibrating wall assembly of the present invention can be employed with any suitable apparatus useful for shaping, and/or directing the flow of, deformable materials. Such suitable uses will be apparent to those skilled in the art once reading the description of the present invention as set out herein.

When practicing this invention, sensors can be used to monitor certain physical characteristics of the deformable material during the molding process. These sensors can be designed to send information to a data processor. The data processor can be designed to monitor and control the vibration pattern during the shaping process. Examples of sensors which can be used for this purpose include, without limitation, pressure sensors, displacement sensors, various rheological sensors (e.g., viscosity, dielectric, temperature, etc.) and the like, and/or any combination thereof.

The shaping process and apparatus disclosed herein is suitable for application to a deformable material which comprises a polymer material (e.g., an organic polymer material). Moreover, the process and apparatus may be applied to thermosettable polymer materials (e.g., those formed in situ by Reactive Injection Molding (RIM) processes).

This process and apparatus can also be applied to thermoplastic polymer materials. Examples of such materials include, without limitation, those which are amorphous, certain polyesters, free radical-polymerized polystyrene, polymers of (meth)acrylate esters, poly(ether-sulphones) polycarbonates and PVC, those which may be, or become during molding, semicrystalline polymer materials, as well as semicrystalline polymer material which can be effectively oriented.

The process and apparatus of this invention is also particularly suitable for application to polymer material which comprises a liquid crystalline, preferably a thermotropic liquid crystalline, polymer (e.g., liquid crystalline polyester, preferably a liquid crystalline aromatic polyester).

Blends of one or more of thermoplastic polymers, including one or more liquid crystalline polymers, may be molded by the process and apparatus of this invention. Moreover, the deformable material used may comprise a filler (e.g., a fibrous filler such as glass or carbon fiber). Preferred filled molding compositions include glass fiber-filled polypropylene and poly(aryletherketone) and, carbon fiber-filled poly(aryletherketone) and nylon.

At high loadings (e.g., from 50 to 80% by volume of filler), the resulting molded articles can be subjected to controlled heat treatment to convert them into sintered ceramic or metal products. Moreover, when a second, anisotropic, refractory filler is present (e.g., a refractory fibrous filler), such products subjected to the process and apparatus of the present invention will have oriented fibers.

When practicing the present invention, the deformable material introduced into the mold, die or transfer Channel should not be too fluid during the vibration process. For example, polymer materials having a melt flow index (MFI) ranging from between about 4 to about 15, preferably from between about 5 to about 6, are very suitable. Specifically, in some instances, when the MFI is greater than about 15 the molten material tends to be too fluid to enable sufficient work to be done on it during the stress varying stage. On the other hand, when the MFI is below about 4, the material tends to be too intractable.

The present invention can be used in conjunction with any shaping apparatus wherein a moldable material is introduced into a mold. It is most advantageous when the shaping apparatus is an injection molding device, an extrusion molding device, a blow molding device or a transferring device.

As stated earlier, one of the many features of the present invention is that it provides a novel vibrating wall assembly which can exert a periodic positive and/or negative hydrostatic force onto a deformable material passing thereover. In accordance with the present invention, the manner in which these forces are exerted onto the deformable material is by the limited, pulsating movement of bladder regions.

In one preferred embodiment, this pulsating action is in a direction which is generally perpendicular to the flow of the deformable material thereover. In another preferred embodiment the pulsating movement is tilted in the direction of flow. In this latter preferred embodiment, the pulsating action would also result in pushing the material passing thereover. Depending on the specific factors, this tilted pulsating action can stretch the material flowing thereover.

The vibrating wall assembly of the present invention can also be employed in a system which transports and/or treats extruded plastic pipes or rods coming out from an extrusion die. As demonstrated above, the frequency, amplitude and phase at which individual bladder regions pulsate can be programmed, thus creating the effect of a vibrating wall over which the extruded plastic pipes will pass as they are being cooled.

The novel vibrating wall assembly of the present invention can also be employed to transport liquid-pasty and/or liquid-rubbery matter along distances inside annular or slit dies. By employing the vibrating wall assembly of the present invention, the normal amount of friction encountered at the interface between the outside wall surface of the vibrating wall assembly and the flowing plastic material can be drastically reduced. This can be used for runners or hot runners which are utilized in molding technology to transport flowable plastic to the mold cavity, inducing faster filling rates and producing advantageous filling patterns. Moreover, the vibrating effect of the novel wall assembly also provides an advantage in that it subjects the flowing material to a rheological treatment as disclosed in U.S. Pat. No. 4,469,649.

The modifications of the material's physical properties, due to the vibration levels to which it is subjected via the novel vibrating wall assembly, can be beneficially used to increase the material's processability. For example, when the material's yield strength at the corresponding temperature, for the given state of vibration, is greater than zero, but still sufficiently low enough to accommodate the amount of force provided by the local displacement of the pulsating bladder regions, cold drawing is performed on the material. This results in a great deal of strain hardening due to orientation in several directions. Here, the part submitted to a longitudinal motion along the vibrating wall assembly is, therefore, transversely hammered by the pulsating bladder regions which can be designed to act as small pins calendaring the material to create improved conditions of orientation by the plastic yielding process. This type of vibrational treatment is especially useful in the case of pipe extrusion molding processes.

Figure 2:
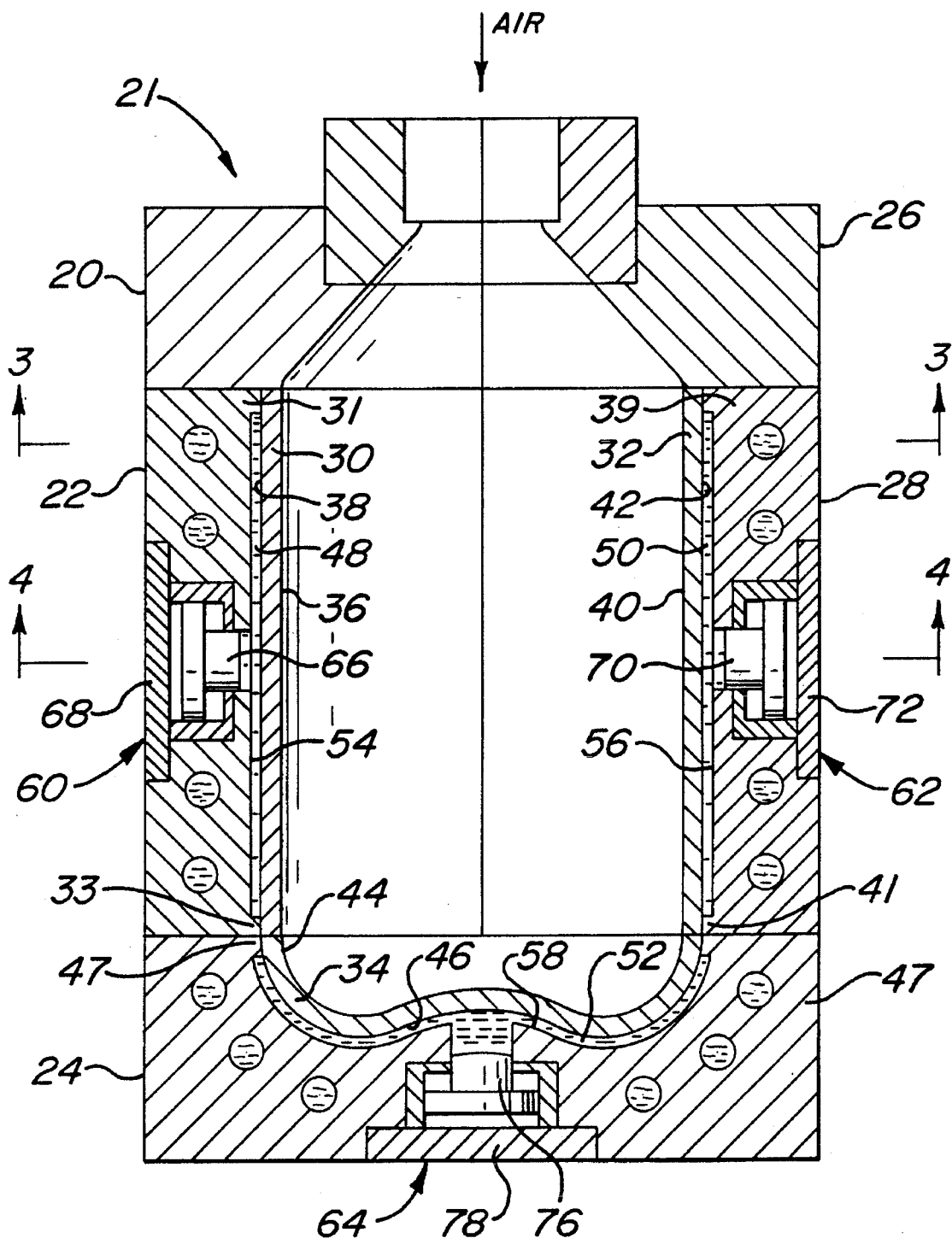
FIG. 2 is a cross-sectional view of the mold illustrated in FIG. 1, taken along line 2—2.
Figure 3:
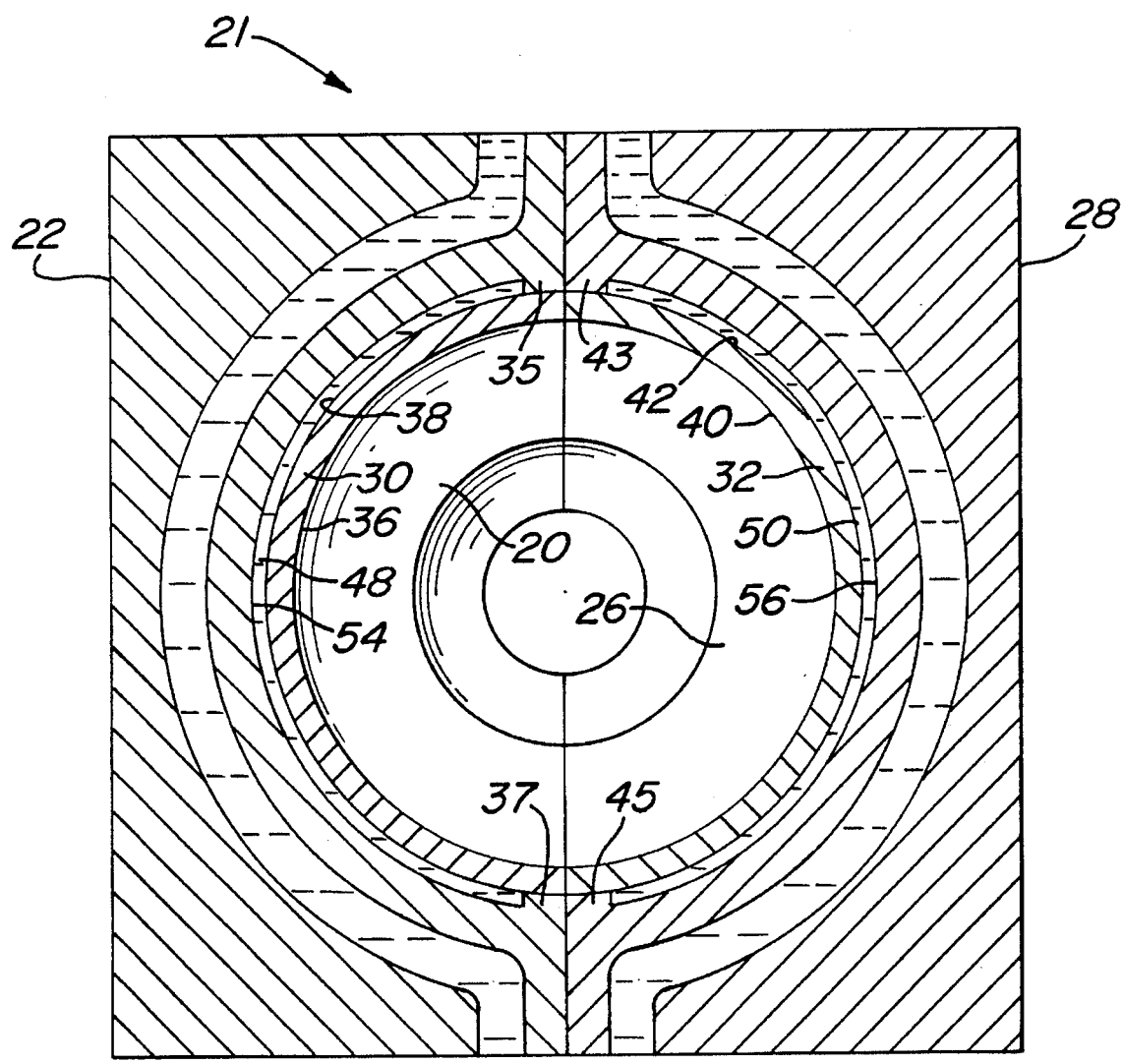
FIG. 3 is a cross-sectional view of the mold illustrated in FIG. 2, taken along line 3—3.
Figure 4:
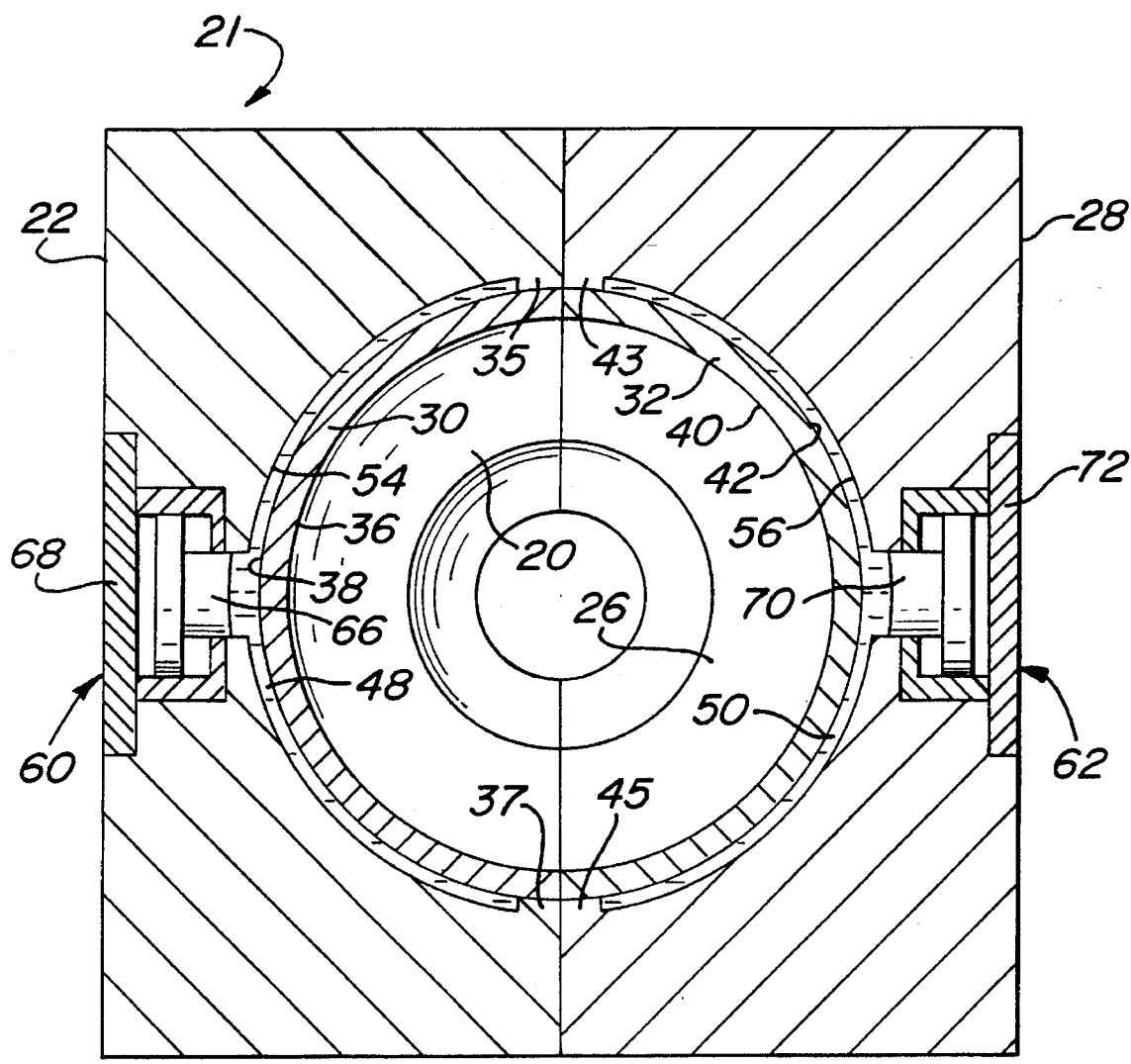
FIG. 4 is a cross-sectional view of the mold illustrated in FIG. 2, taken along line 4—4.

Referring now to the figures. FIGS. 1–4 illustrate one embodiment of a vibrating wall assembly designed in accordance with the present invention. Specifically, FIG. 1 illustrates a frontal, partially sectioned and partially cross-sectioned view of a mold which includes one embodiment of the novel vibrating wall assembly encompassed by this invention; FIG. 2 is a cross sectional view of FIG. 1 taken along line 2—2; FIG. 3 is a cross sectional view of FIG. 2 taken along line 3—3; and, FIG. 4 is a cross sectional view of FIG. 2 taken along line 4—4.

FIGS. 1–4 provide various views of a mold 21. Mold 21 is designed for use in a blow molding process.

Mold 21 is made up of a left-side top section 20, a right-side top section 26, a left-side body section 22, a right-side body section 28 and a base section 24. Mold 21 also includes a vibrating wall assembly.

This vibrating wall assembly includes, among other things, left-side body bladder 30, right-side body bladder 32 and base bladder 34. Left-side body bladder 30 has an inside wall surface 36 and an outside wall surface 38; right-side body bladder 32 has an inside wall surface 40 and an outside wall surface 42; and base bladder 34 has an inside wall surface 44 and an outside wall surface 46.

Bladders 30, 32 and 34 are fastened onto mold sections 22, 28 and 24, respectively. Specifically, top and bottom portions of bladder 30 are welded onto horizontal ledges 31 and 33 protruding from mold section 22 by an electron beam.

On the other hand, the side portions of bladder 30 are welded onto vertical ledges 35 and 37 also protruding from mold section 22. Similarly, top and bottom portions of bladder 32 are also electronic beam welded onto horizontal ledges 39 and 41 protruding from mold section 28; and the side portions of bladder 32 are similarly electron beam welded onto vertical ledges 43 and 45 also protruding from mold section 28. Finally, bladder 34 is electron beam welded onto horizontal ledge 47 protruding along the inside circumference of mold section 24.

Any suitable means can be used to fasten the bladder to the mold body. The preferred fastening method will depend, in part, upon the composition of the bladder, the maximum temperature and pressure conditions which are expected to be encountered during the molding process, and the composition of the displacement fluid. The specific manner used to fasten the bladder onto the mold body must create a leak-free environment. In other words, it should be such that it prevents the leakage of displacement fluid therethrough during a molding and vibration process.

Notwithstanding the above, examples of suitable fastening techniques include, without limitation, welding (e.g., electron beam welding), brazing, adhering (e.g., using glues, epoxies, curable resins, etc.), clamping (e.g., using screws, bolts, rivets, etc.), and the like, and/or any combination thereof. Those skilled in the art will be able to select the fastening manner which best suits their needs after reading this specification.

However, it is also within the purview of this invention to have the bladder formed as an integral part of the mold. An example of this embodiment is illustrated in FIGS. 9 and 10.

As can be seen from these Figures, the bladder 49 is part of the mold body 51. When making mold body 51, fluid displacement chambers 53, 55, 57 and 59 are incorporated therein.

Returning now to the embodiment illustrated in FIGS. 1–4, the vibrating wall assembly in this embodiment also includes fluid displacement chambers 48, 50 and 52. Chamber 48 is defined, in part, by bladder outside wall surface 38, mold inside wall surface 54, horizontal ledges 31 and 33 and vertical ledges 35 and 37. Similarly, chamber 50 is defined, in part, by bladder outside wall surface 42, mold inside wall surface 56, horizontal ledges 39 and 41 and vertical ledges 43 and 45. Finally, chamber 52 is defined, in part, by bladder outside wall surface 46, mold inside wall surface 58 and horizontal ledge 47.

Chambers 48, 50 and 52 are in fluid communication with fluid displacement devices 60, 62 and 64, respectively. Displacement device 60 includes piston 66 and piston housing 68; displacement device 62 includes piston 70 and piston housing 72; and displacement device 64 includes piston 74 and piston housing 76.

The seals formed between the pistons and their respective housings must prevent any substantial leakage of displacement fluid out of the corresponding fluid displacement chambers. On the other hand, the seals must permit the piston to be reciprocatable within its respective housing.

The preferred seal will depend, in part, upon the expected maximum temperature and pressure conditions which will be encountered during the shaping process, the specific displacement fluid employed, and the reciprocation method employed. Those skilled in the art will be able to select the sealing means which best suits their needs after reading this specification.

A displacement fluid is confined within chambers 48, 50 and 52. The volume of fluid confined within these chambers depends, in part, upon the size of the chamber, the composition of the displacement fluid, the fluid displacement means employed and the desired effects of the vibration process.

In a presently preferred embodiment, the volume of the displacement fluid contained within the chamber is such that it completely fills the chamber when the fluid displacement means is neither in its fully pressurized position nor in its fully depressurized position. This embodiment permits the corresponding bladder to exert both, a positive and negative hydrostatic force on the deformable material.

On the other hand, it is also within the purview of this invention to have the displacement fluid completely fill the chamber when the fluid displacement means is in either its fully pressurized or fully depressurized positions. In the former embodiment, the corresponding bladder will be able to exert a maximum negative hydrostatic force onto the deformable material. Conversely, in the latter embodiment, the corresponding bladder will be able to exert a maximum positive hydrostatic force onto the deformable material.

Figure 6:
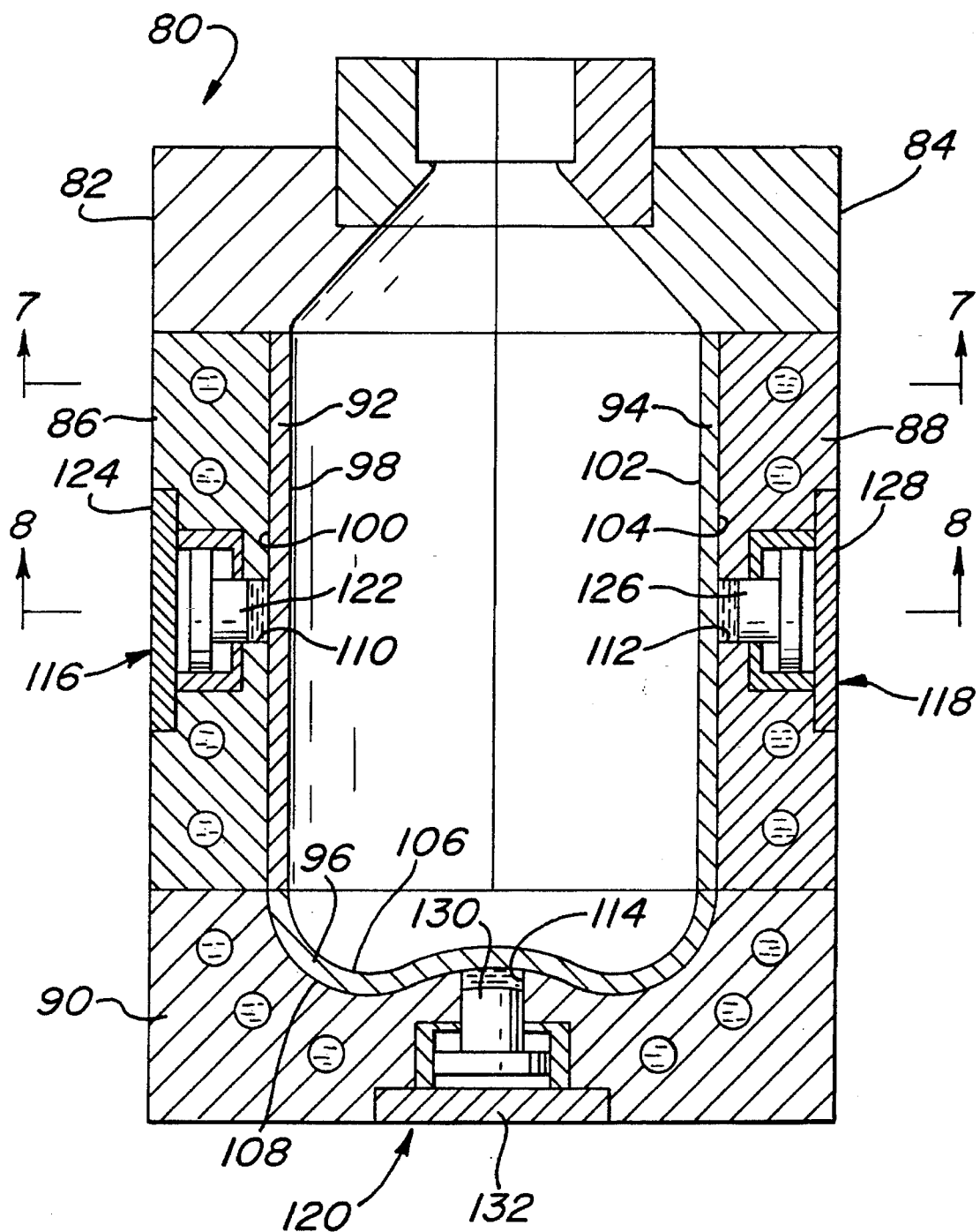
FIG. 6 is a cross-sectional view of the mold illustrated in FIG. 5, taken along line 6—6.
Figure 7:
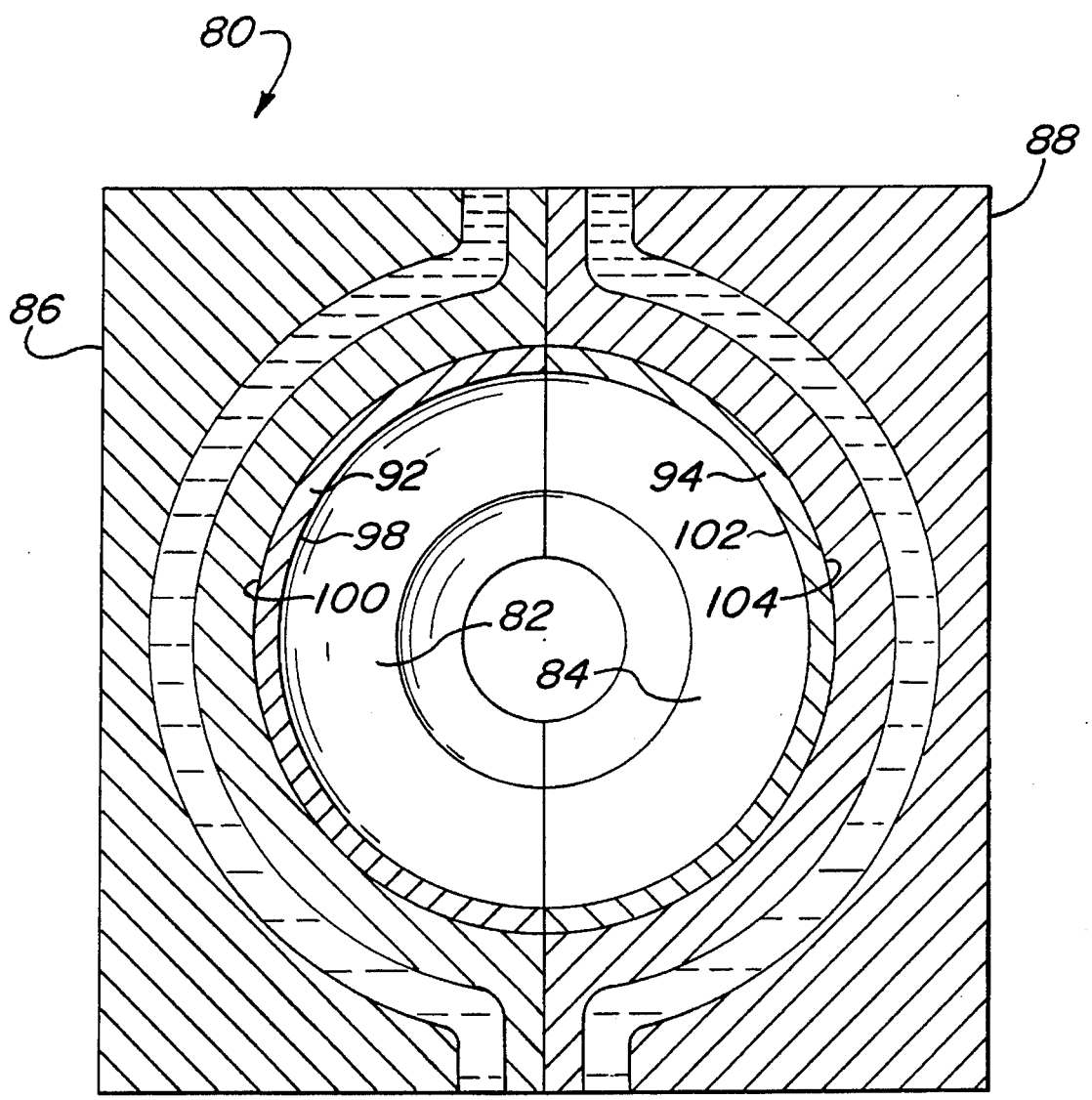
FIG. 7 is a cross-sectional view of the mold illustrated in FIG. 6, taken along line 7—7.
Figure 8:
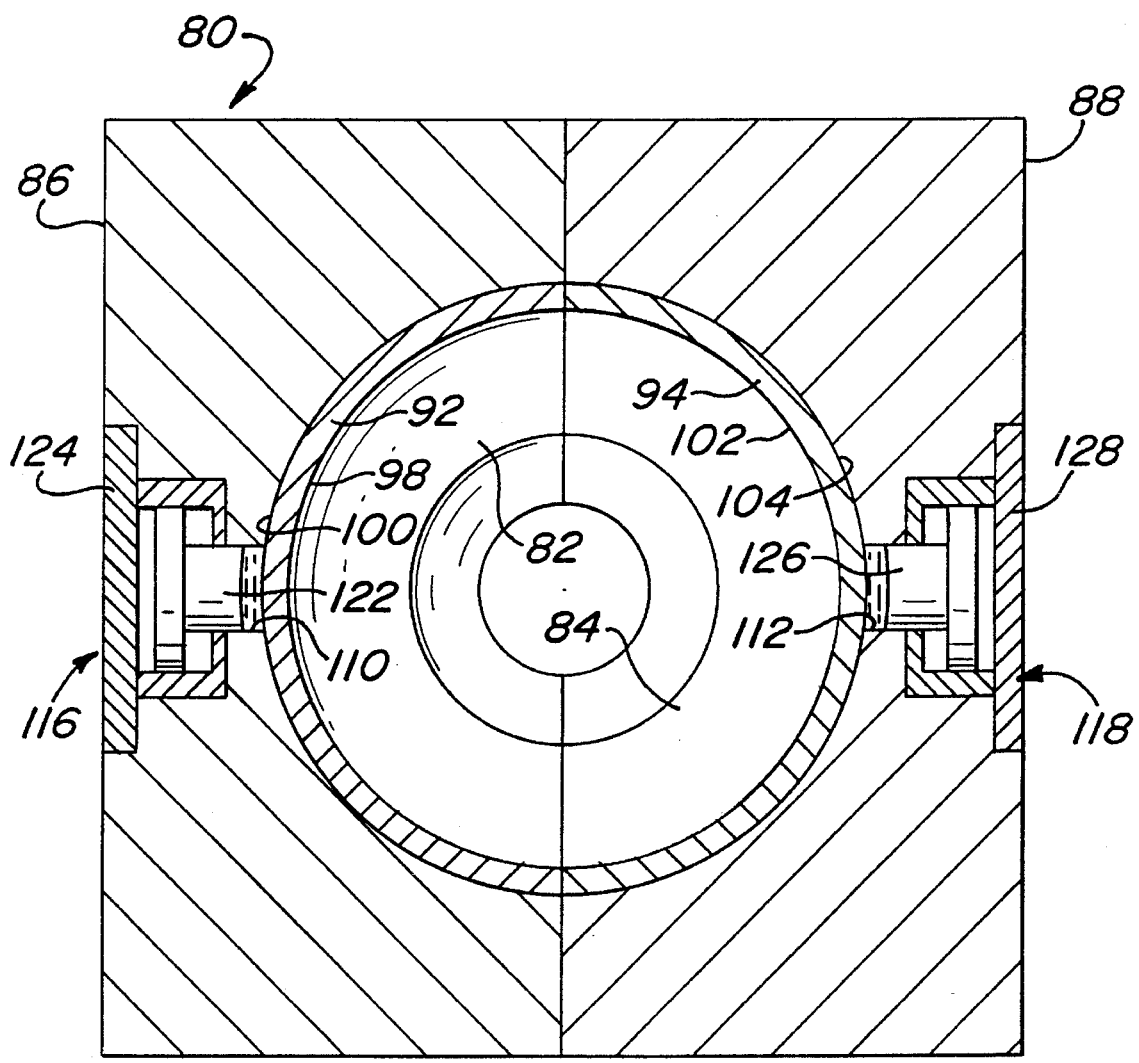
FIG. 8 is a cross-sectional view of the mold illustrated in FIG. 6, taken along line 8—8.

FIGS. 5–8 illustrate another embodiment of a vibrating wall assembly designed in accordance with the present invention. Specifically, FIG. 5 illustrates a frontal, partially sectioned and partially cross-sectioned view of a mold which includes another embodiment of the novel vibrating wall assembly encompassed by this invention; FIG. 6 is a cross sectional view of FIG. 5 taken along line 6—6; FIG. 7 is a cross sectional view of FIG. 6 taken along line 7—7; and, FIG. 8 is a cross sectional view of FIG. 6 taken along line 8—8.

FIGS. 5—8 provide various views of a mold 80. Mold 80 is also designed for use in a blow molding process.

Mold 80 is made up of a left-side top section 82, a right-side top section 84, a left-side body section 86, a right-side body section 88 and a base section 90. Mold 80 also includes a vibrating wall assembly.

This vibrating wall assembly includes, among other things, left-side body bladder 92, right-side body bladder 94 and base bladder 96. Left-side body bladder 92 has an inside wall surface 98 and an outside wall surface 100; right-side body bladder 94 has an inside wall surface 102 and an outside wall surface 104; and base bladder 96 has an inside wall surface 106 and an outside wall surface 108.

Bladders 92, 94 and 96 are electron beam welded onto mold sections 86, 88 and 90, respectively. When comparing the embodiment illustrated in FIGS. 1–4 with that illustrated in FIGS. 5–8, it can be seen that the latter embodiment does not have ledge protruding from the various mold sections. This configuration can be used to create a different type of vibration effect.

For example, since a majority of the bladders' outside wall surface is in contact with the mold sections' inside wall surface, fluid flow channels can be defined therebetween by the selective fastening of various bladder sections to the mold's inside wall surface. These channels should, in turn, be in fluid communication with the auxiliary fluid displacement chambers 110, 112 and 114 positioned within mold sections 86, 88 and 90, respectively.

On the other hand, the bladders can be secured to the mold sections at a very close proximity to the auxiliary fluid displacement chambers. This concentrates the vibration affect to a very specific location.

As with the former embodiment, any suitable means can be used to fasten the bladder to the mold body. The preferred fastening method will depend, in part, upon the composition of the bladder, the maximum temperature and pressure conditions which are expected to be encountered during the molding process, and the composition of the displacement fluid. Those skilled in the art will be able to select the fastening manner which best suits their needs after reading this specification.

Auxiliary fluid displacement chambers 110, 112 and 114 are in fluid communication with fluid displacement devices 116, 118 and 120, respectively. Displacement device 116 includes piston 122 and piston housing 124; displacement device 118 includes piston 126 and piston housing 128; and displacement device 120 includes piston 130 and piston housing 132.

As with the former embodiment, the seals formed between the pistons and their respective housings must prevent any substantial leakage of displacement fluid out of the corresponding fluid displacement chambers. On the other hand, the seals must permit the piston to be reciprocatable within its respective housing.

The preferred seal will depend, in part, upon the expected maximum temperature and pressure conditions which will be encountered during the shaping process, the specific displacement fluid employed, and the reciprocation method employed. Those skilled in the art will be able to select the sealing means which best suits their needs after reading this specification.

A displacement fluid is confined within auxiliary fluid displacement chambers 110, 112 and 114. The volume of fluid confined within these chambers depends, in part, upon the size of the chamber, the composition of the displacement fluid, the fluid displacement means employed and the desired effects of the vibration process.

In a presently preferred embodiment, the volume of the displacement fluid contained within the auxiliary fluid chamber is such that it completely fills the chamber when the fluid displacement means is neither in its fully pressurized position nor in its fully depressurized position. This embodiment permits the corresponding bladder to exert both, a positive and negative hydrostatic force on the deformable material.

On the other hand, it is also within the purview of this invention to have the displacement fluid completely fill the auxiliary chamber when the fluid displacement means is in either its fully pressurized or fully depressurized positions.

Figure 11:
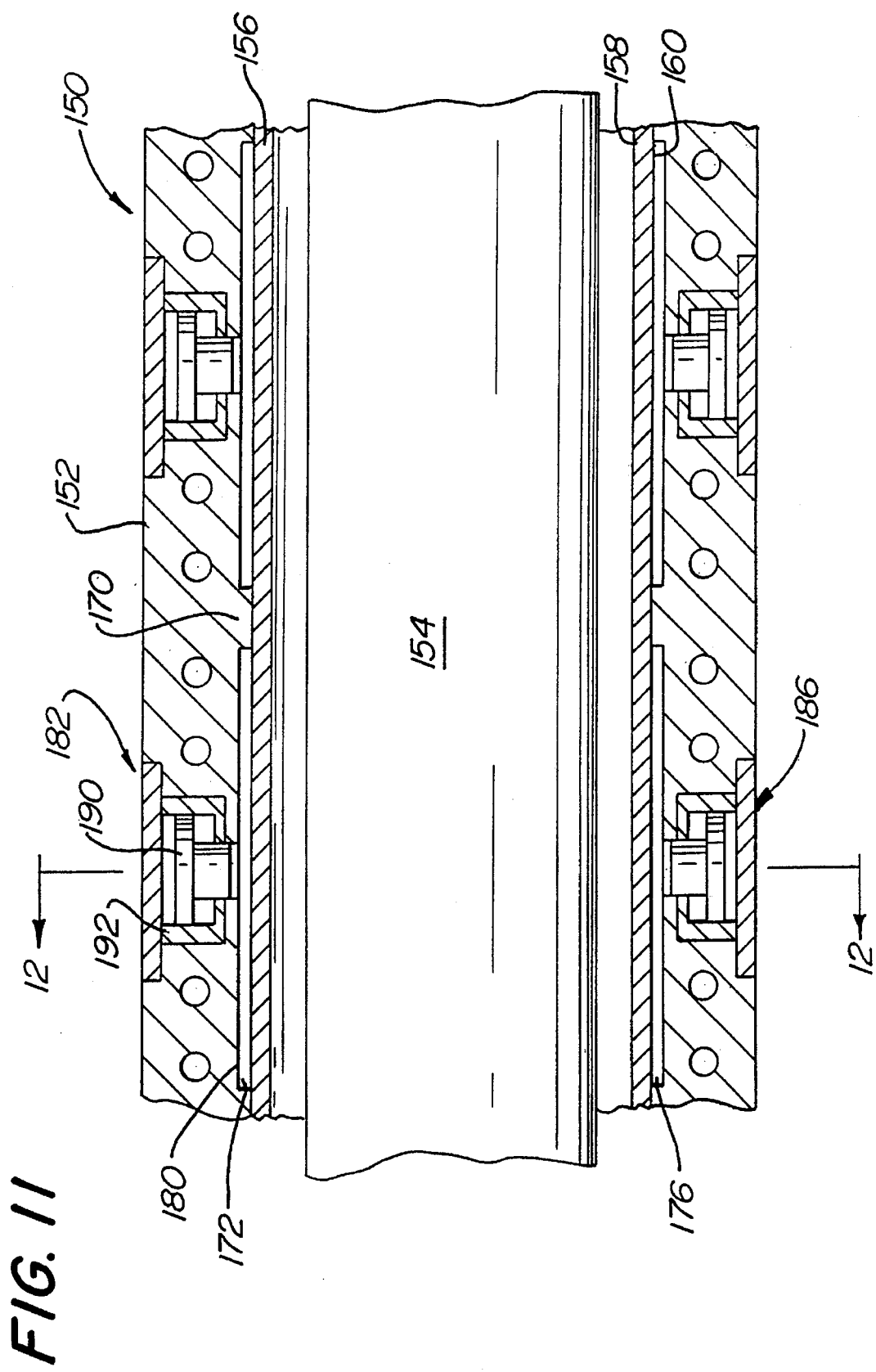
FIG. 11 is a cross-sectional view of an extrusion die or a transfer channel which includes another embodiment of the novel vibrating wall assembly encompassed by this invention.
Figure 12:
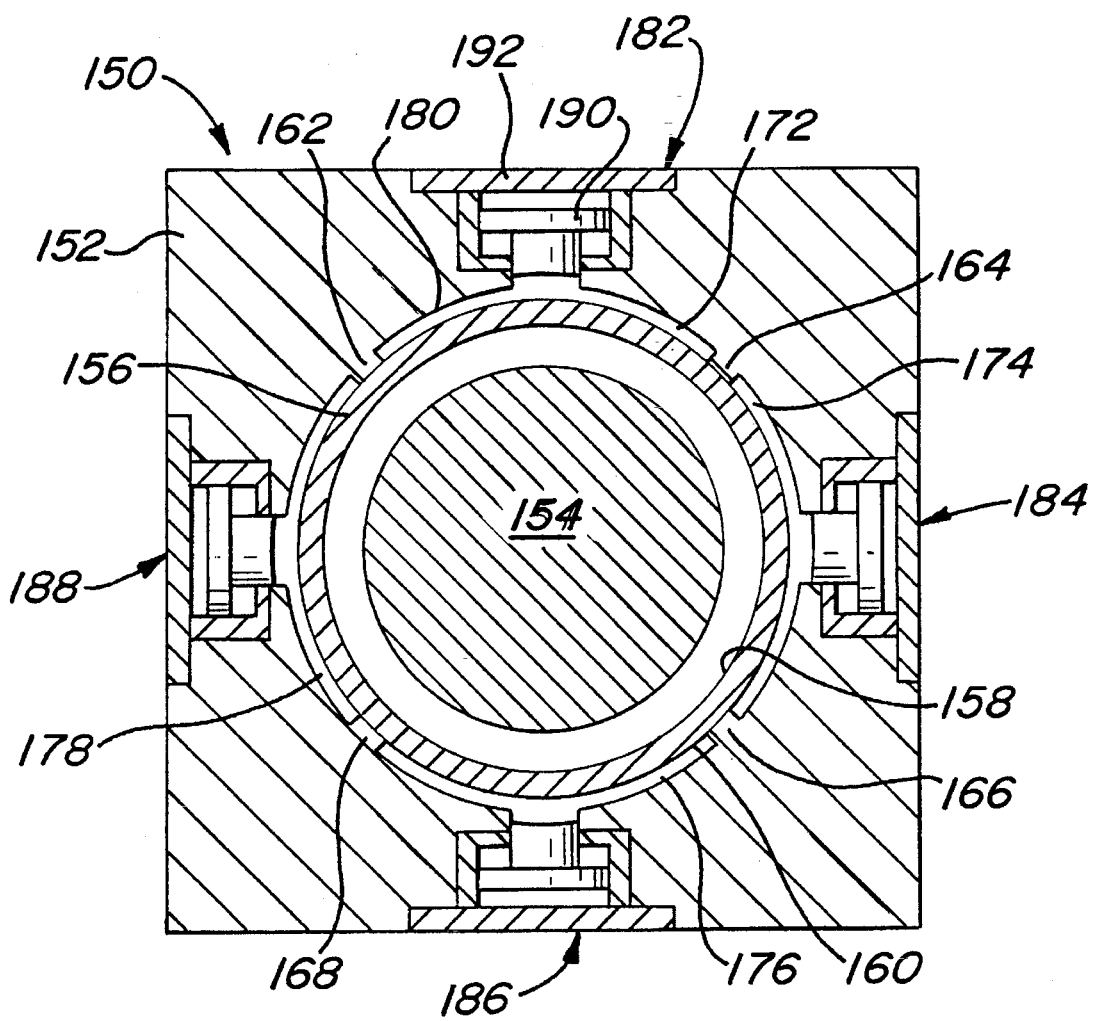
FIG. 12 is a cross-sectional view of the die or channel illustrated in FIG. 11 taken along line 12—12.

FIGS. 11 and 12 illustrate still another embodiment of a vibrating wall assembly designed in accordance with the present invention. Specifically, FIG. 11 illustrates a cross-sectional view of an extrusion die or a transfer channel which includes an embodiment of the novel vibrating wall assembly similar to that illustrated in FIGS. 1–4. FIG. 12 illustrates a cross-sectional view of the die or channel illustrated in FIG. 11, taken along line 12—12.

FIGS. 11 and 12 provide various views of an extrusion die or transfer channel. For purposes of simplifying this disclosure, the shaping apparatus illustrated in FIGS. 11 and 12 will be generally referred to as conduit 150. Conduit 150 can be designed for use in an extrusion molding process or a transferring process.

Conduit 150 is made up of an outside section 152 and an inside section 154. Conduit 150 also includes a vibrating wall assembly.

This vibrating wall assembly of conduit 150 includes, among other things, bladder 156. Bladder 156 has an inside wall surface 158 and an outside wall surface 160.

Bladder 156 is electron beam welded onto mold section 152. Specifically, bladder 156 is electron beam welded onto longitudinal rib sections 162, 164, 166 and 168 protruding from mold section 152. Moreover, bladder 156 is also electron beam welded onto radial rib 170 also protruding from mold section 152.

This vibrating wall assembly also includes fluid displacement chambers 172, 174, 176 and 178. Chamber 172 is defined, in part, by bladder outside wall surface 160, mold inside wall surface 180, longitudinal ribs 162 and 164 and radial rib 170. Chambers 174, 176 and 178 are similarly defined.

Chambers 172, 174, 176 and 178 are in fluid communication with fluid displacement devices 182, 184, 186 and 188, respectively. Displacement device 182 includes piston 190 and cylinder 192. Displacement devices 184, 186 and 188 also include similar piston-cylinder configurations.

As indicated above, the seals formed between the pistons and their respective housings must prevent any substantial leakage of displacement fluid out of the corresponding fluid displacement chambers. On the other hand, the seals must permit the piston to be reciprocatable within its respective housing.

A displacement fluid is confined within chambers 172, 174, 176 and 178. The volume of fluid confined within these chambers depends, in part, upon the size of the chamber, the composition of the displacement fluid, the fluid displacement means employed and the desired effects of the vibration process.

In FIGS. 11 and 12, inside conduit section 154 is depicted as a solid rod. It should be noted, however, that it is within the purview of this invention for inside conduit section 154 to have a vibrating wall assembly thereon. This embodiment would result in vibrating the inside and outside surfaces of a deformable material passing therethrough.

On the other hand, it is also within the purview of this invention for the vibrating wall assembly to be only around inside conduit section 154. In this embodiment, only the inside wall surface of the deformable material will be vibrated.

If it is desirable to vibrate a bladder circumvented around conduit inside wall section 154, any suitable means can be used to reciprocate the fluid displacement means. For example, these displacement means can be reciprocated remotely by pneumatic, electronic, mechanical and/or hydraulic devices. One specific manner in which these displacement means can be reciprocated is illustrated in FIGS. 7 and 8 of allowed U.S. patent application Ser. No. 07/880,926 now U.S. Pat. No. 5,306,129.

Figure 13:
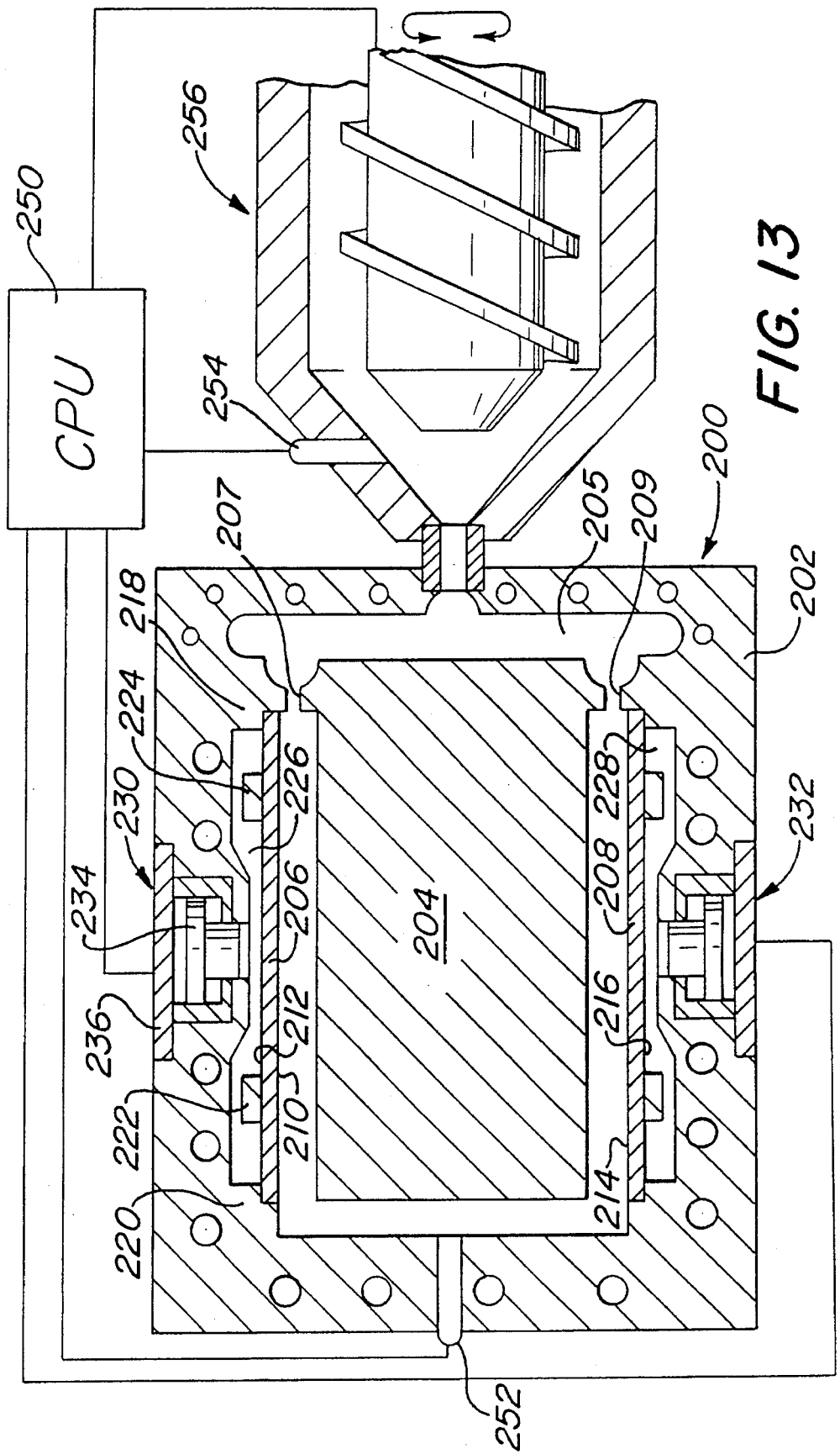
FIG. 13 is a cross-sectional view of a mold designed for use in an injection molding apparatus which includes one embodiment of the novel vibrating wall assembly encompassed by this invention.

FIG. 13 illustrates yet another embodiment of a vibrating wall assembly designed in accordance with the present invention. Specifically, FIG. 13 is a cross-sectional view of a mold 200 designed for use in an injection molding apparatus. Mold 200 includes an embodiment of the novel vibrating wall assembly similar to that illustrated in FIGS. 1–4.

Mold 200 is made up of an outside section 202 and an inside section 204. Mold 200 also includes a vibrating wall assembly.

This vibrating wall assembly includes, among other things, bladders 206 and 208. Bladder 206 has an inside wall surface 210 and an outside wall surface 212. Similarly, bladder 208 has an inside wall surface 214 and an outside wall surface 216.

Bladder 206 is welded onto mold section 202. Specifically, bladder 206 is welded onto ledge sections 218 and 220 recessed within mold section 202. Moreover, bladder 206 is also welded onto baffles 222 and 224 protruding from mold section 202. Bladder 208 is welded to mold section 202 in a similar manner.

It is within the purview of, this invention for there to be a vibrating wall assembly around mold inside wall Section 204. Moreover, a vibrating wall assembly can also be incorporated into the runner 205 and/or gates 207 and 209 of mold 200. If the vibrating wall assembly is incorporated into runner 205 and/or gates 207 and 209, it can take the form of the vibrating wall assembly illustrated in FIGS. 10 and 11, with or without conduit inside wall section 154.

Referring back to FIG. 13, the vibrating wall assembly illustrated therein also includes fluid displacement chambers 226 and 228. Chambers 226 and 228 are defined, in part, by their respective bladder's outside wall surface, mold section's 202 inside wall surface, their respective recessed ledges, and the surfaces of the baffles. With the placement of these baffles within the fluid displacement chambers, a unique vibration pattern can be achieved. After reading this specification and performing simple deductive tests, those skilled in the art will be able to position the baffles within the chambers to best suit their specific needs.

Chambers 226 and 228 are in fluid communication with fluid displacement devices 230 and 232, respectively. Displacement device 230 includes piston 234 and piston housing 236. Displacement device 232 also includes a similar piston-piston housing configuration.

As indicated above, the seals formed between the pistons and their respective housings must prevent any substantial leakage of displacement fluid out of the corresponding fluid displacement chambers. On the other hand, the seals must permit the piston to be reciprocatable within its respective housing.

A displacement fluid is confined within chambers 226 and 228. The volume of fluid confined within these chambers depends, in part, upon the size of the chamber, the composition of the displacement fluid, the fluid displacement means employed and the desired effects of the vibration process.

In addition to the above, the molding apparatus illustrated in FIG. 13 also includes a central processing unit (CPU) 250. CPU 250 is linked to sensors 252 and 254. Sensors 252 and 254 are designed to monitor the temperature and flow rate of the deformable material, as well as the hydrostatic force, shear stresses and stress tensor imparted thereon.

Although it is preferred to have a plurality of probes, each monitoring a single parameter, to simplify the drawings, all of the probes are collectively referred to as sensors 252 and 254. It should be noted that it is within the purview of this invention to employ additional sensors which monitor other process and/or rheological parameters.

CPU 250 is also linked to fluid displacement devices 230 and 232. This link serves not only to monitor the position, frequency, amplitude and phase shift of the displacement means' respective pistons, but also to control these parameters. It should be noted that it is within the purview of this invention to employ a piston energizing means which is interposed between CPU 250 and the various fluid displacement devices. In order to simplify the drawings, such an energizing means is being omitted.

Finally, CPU 250 is also linked to injection device 256. This link serves not only to monitor the injection device's operating parameters, but also to control these parameters.

Due to the computer link system illustrated in FIG. 13, skilled artisans can devise a number of different shaping processes which take into consideration the molding process parameters and specific vibration patterns. This information can then be stored for subsequent use in order to reproduce a product having the same physicochemical characteristics. As will be appreciated by those skilled in the art, such a computer link system can be incorporated into any shaping apparatus encompassed by this invention.

As can be seen from the foregoing, by practicing the present invention, the physical properties of a molded product can be controlled and/or altered. Specifically, by passing a deformable material over the vibrating wall assembly of the present invention, the shear stresses, hydrostatic force and/or stress tensor within the molded product can be controlled and/or altered. Moreover, the implementation of the present invention to a sheet die apparatus having a flat surface rheological cooling unit made up of a vibrating wall assembly as described herein is also encompassed by the present invention.

As also can be seen from ,the foregoing, if the novel vibrating wall assembly disclosed herein defines at least one surface of a mold or die geometric configuration, it can eliminate at least some of the presence of "rivers" resulting within the molded product. This will, in turn, minimize the degree of shrinkage during the solidification stage.

Furthermore, by properly positioning the vibrating wall assemblies within the mold cavity, this invention can reduce and/or eliminate the detrimental effects associated with knit lines. Specifically, it is known that, in conventional molding practices, the strength of the knit line is reduced due to the tendency of the molecules (and/or fibers if contained within the moldable material) to align perpendicular to this knit line. However, the vibrating wall assembly of this invention will modify flow patterns. This will result in significantly strengthening the knit line.

It is evident from the foregoing that various modifications can be made to embodiments of this invention without departing from the spirit and scope thereof, which will be apparent to those skilled in the art. Thus having described the invention, it is claimed as follows.

That which is claimed is:

1. An apparatus, for shaping, or directing flow of, deformable materials by affecting the material's physiochemical properties, said apparatus comprises:
   a. a mold, die or transfer channel body, wherein at least a portion of the mold's, die's or transfer channel's inside wall surface defines a cavity into which, or through which, a deformable material will pass,
   b. at least a first vibrating wall assembly incorporated into the mold's, die's or transfer channel's body such that the first vibrating wall assembly's inside wall surface defines at least a part of the cavity into which, or through which, a deformable material will pass, said vibrating wall assembly comprising:
      i. at least a first pliable wall whose outside wall surface is adjacent to at least a portion of the mold's, die's or transfer channel's inside wall surface, and whose inside wall surface defines at least a part of the cavity into which, or through which, a deformable material will pass,
      ii. at least a first chamber for confining a displaceable fluid, said first chamber being in communication with at least a portion of the first pliable wall's outside wall surface,
      iii. a displaceable fluid confined within said first displaceable fluid chamber,
      iv. at least a first means for displacing the displaceable fluid confined within said first displaceable fluid chamber, and
   c. driver for imparting a predetermined frequency and amplitude for generating a vibratory motion of the pliable wall for altering the physiochemical properties of the material to shape and direct the flow of the material, and
   d. wherein said first vibrating wall assembly forms a portion of a conduit through which a material passes, said first vibrating wall resonating in a direction perpendicular to the flow of the material in an extrusion molding process or in a process of manufacturing pipes or rods.

2. An apparatus as recited in claim 1, wherein the first pliable wall is designed to withstand environmental conditions encountered within the mold's, die's or transfer channel's cavity during a shaping process.

3. An apparatus as recited in claim 2, wherein the first pliable wall is designed to withstand pressures ranging from between about 100 psi to about 20,000 psi, and temperatures ranging from between about 20° C. to about 400° C.

4. An apparatus as recited in claim 3, wherein the first pliable wall comprises at least one material selected from the group consisting of: reinforced synthetic materials, reinforced leather, stainless steel and any combination thereof.

5. An apparatus as recited in claim 4, wherein the first pliable wall comprises stainless steel.

6. An apparatus as recited in claim 5, wherein at least a portion of the first pliable wall is fastened to a portion of the mold's, die's or transfer channel's inside wall surface by an electron beam weld.

7. An apparatus as recited in claim 1, wherein at least a portion of the first pliable wall's inside wall surface is coated with a coating material.

8. An apparatus as recited in claim 7, wherein the coating material is selected from the group consisting of polytetrafluoroethylene, polybichloril-difluoril-ethylene, metallic alloy coatings, and any combination thereof.

9. An apparatus as recited in claim 1, wherein the first displaceable fluid chamber comprises a non-deformable chamber which is in fluid communication with at least a portion of the first pliable wall's outside wall surface.

10. An apparatus as recited in claim 9, wherein the first displaceable fluid chamber is defined, in part, by at least a portion of the first pliable wall's outside wall surface being positioned adjacent to, but spaced apart from, at least a portion of the mold's, die's or transfer channel's inside wall surface.

11. An apparatus as recited in claim 10, wherein the first displaceable fluid chamber comprises at least one baffle which directs the displacement of the displaceable fluid therearound.

12. An apparatus as recited in claim 1, wherein the first fluid displacing means is selected from the group consisting of: a mechanical displacing device, an electronic displacing device, a magnetic displacing device, an electromagnetic displacing device, a hydraulic displacing device, a pneumatic displacing device, a solenoid displacing device, a Piezoelectric displacing device, and any combination thereof.

13. An apparatus as recited in claim 12, wherein the first fluid displacing means comprises a drivable member which is reciprocable within, and relative to, a cylinder.

14. An apparatus as recited in claim 13 further comprising a reciprocating device which reciprocates the drivable member within the cylinder, said reciprocating device being selected from the group consisting of: a mechanical reciprocating device, an electronic reciprocating device, a magnetic reciprocating device, an electro-magnetic reciprocating device, a hydraulic reciprocating device, a pneumatic reciprocating device, a solenoid-type reciprocating device, a Piezoelectric reciprocating device, and any combination thereof.

15. An apparatus as recited in claim 1, wherein the displaceable fluid comprises at least one fluid selected from the group consisting of: a liquid, a fluidized bed of particles, a gel, a gas and any combination thereof.

16. An apparatus as recited in claim 1, wherein the displaceable fluid comprises at least one fluid selected from the group consisting of: water, organic filled oils, mineral filled oils, organic unfilled oils, mineral unfilled oils, filled oils with powders, silicon oils, cured silicon gels, uncured silicon gels, swellable porous foams, swellable porous gels, fluidized particles, and any combination thereof.

17. An apparatus as recited in claim 1, further comprising a central processing unit linked to said first fluid displacing means.

18. An apparatus, for shaping, or directing flow of, deformable materials, said apparatus comprises:
　a. a mold, die or transfer channel body, wherein at least a portion of the mold's, die's or transfer channel's inside wall surface defines a cavity into which, or through which, a deformable material will pass,
　b. at least a first vibrating wall assembly incorporated into the mold's, die's or transfer channel's body such that the first vibrating wall assembly's inside wall surface defines at least a part of the cavity into which, or through which, a deformable material will pass, said vibrating wall assembly comprising:
　　i. at least a first pliable wall whose outside wall surface is adjacent to at least a portion of the mold's, die's or transfer channel's inside wall surface, and whose inside wall surface defines at least a part of the cavity into which, or through which, a deformable material will pass,
　　ii. at least a first chamber for confining a displaceable fluid, said first chamber being in communication with at least a portion of the first pliable wall's outside wall surface,
　　iii. a displaceable fluid confined within said first displaceable fluid chamber, and
　　iv. at least a first means for displacing the displaceable fluid confined within said first displaceable fluid chamber, and
　c. wherein the first vibrating wall assembly further comprises at least a second fluid displacement means, and at least a second fluid displacement chamber.

19. An apparatus as recited in claim 18, wherein the second fluid displacement chamber is in communication with at least a portion of the first pliable wall's outside wall surface, and wherein the second fluid displacement chamber is not in fluid communication with the first fluid displacement chamber.

20. An apparatus as recited in claim 18, wherein the first vibrating wall assembly further comprises a second pliable wall whose outside wall surface is adjacent to at least a portion of the mold's, die's or transfer channel's inside wall surface, and whose inside wall surface defines at least a part of the cavity into which, or through which, a deformable material will pass, said second fluid displacement chamber being in communication with at least a portion of said second pliable wall's outside wall surface.

21. An apparatus as recited in claim 18 further comprising a central processing unit linked to at least one device selected from the group consisting of said first fluid displacing means and said second fluid displacing means.

22. An apparatus as recited in claim 1 further comprising at least a second vibrating wall assembly incorporated into the mold's, die's or transfer channel's body such that the second vibrating wall assembly's inside wall surface defines at least a part of the cavity into which, or through which, a deformable material will pass, said second vibrating wall assembly comprises:
　a. at least a second pliable wall whose outside wall surface is adjacent to at least a portion of the mold's, die's or transfer channel's inside wall surface, and whose inside wall surface defines at least a part of the cavity into which, or through which, a deformable material will pass,
　b. at least a second chamber for confining a displaceable fluid, said second chamber being in communication with at least a portion of the second pliable wall's outside wall surface,
　c. a displaceable fluid confined within said second displaceable fluid chamber, and
　d. at least a second means for displacing the displaceable fluid confined within said second displaceable fluid chamber.

23. An apparatus as recited in claim 18, wherein said first vibrating wall assembly forms a portion of a mold wall onto which a parison is blown in a mold designed for use in a blow molding process.

24. An apparatus as recited in claim 18, wherein said first vibrating wall assembly forms a portion of a mold wall in a mold designed for use in an injection molding process.

25. An apparatus for shaping, or directing flow of, deformable materials by affecting the material's physiochemical properties, said apparatus comprises:
　a. a mold, die or transfer channel body, wherein at least a portion of the mold's, die's or transfer channel's inside wall surface defines a cavity into which, or through which, a deformable material will pass, b. at least a first vibrating wall assembly incorporated into the mold's, die's or transfer channel's body such that the first vibrating wall assembly's inside wall surface defines at least a part of the cavity into which, or through which, a deformable material will pass, said vibrating wall assembly comprising:
  i. at least a first pliable wall whose outside wall surface is adjacent to at least a portion of the mold's, die's or transfer channel's inside wall surface, and whose inside wall surface defines at least a part of the cavity into which, or through which, a deformable material will pass,
  ii. at least a first chamber for confining a displaceable fluid, said first chamber being in communication with at least a portion of the first pliable wall's outside wall surface,
  iii. a displaceable fluid confined within said first displaceable fluid chamber,
  iv. at least a first means for displacing the displaceable fluid confined within said first displaceable fluid chamber, and
c. driver for imparting a predetermined frequency and amplitude for generating a vibratory motion of the pliable wall for altering the physiochemical properties of the material to shape and direct the flow of the material, and wherein at least one runner or at least one gate of a mold used in an injection molding process includes said first vibrating wall assembly.

* * * * *